United States Patent
Park et al.

(10) Patent No.: US 10,963,665 B2
(45) Date of Patent: Mar. 30, 2021

(54) METHOD OF SETTING LIGHT SOURCES IN DISPLAY PANEL FOR OPTICAL FINGERPRINT RECOGNITION AND METHOD OF PERFORMING OPTICAL FINGERPRINT RECOGNITION USING THE SAME

(71) Applicant: SAMSUNG ELECTRONICS CO., LTD., Suwon-si (KR)

(72) Inventors: Dong jin Park, Hwaseong-si (KR); Ducksoo Kim, Seoul (KR); Dongki Min, Seoul (KR); Chunghwan Park, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/799,175

(22) Filed: Feb. 24, 2020

(65) Prior Publication Data

US 2020/0387688 A1  Dec. 10, 2020

(30) Foreign Application Priority Data

Jun. 5, 2019 (KR) .................. 10-2019-0066482

(51) Int. Cl.
  *G06K 9/00* (2006.01)
  *G06F 3/0354* (2013.01)
(52) U.S. Cl.
  CPC ....... *G06K 9/00033* (2013.01); *G06K 9/0004* (2013.01); *G06K 9/00026* (2013.01); *G06F 3/03547* (2013.01)

(58) Field of Classification Search
  CPC ............ G06K 9/00033; G06K 9/0004; G06K 9/00026; G06F 3/03547
  See application file for complete search history.

(56) References Cited

U.S. PATENT DOCUMENTS

| | | | |
|---|---|---|---|
| 9,342,733 B2 | 5/2016 | Lee et al. | |
| 10,216,975 B1 | 2/2019 | He et al. | |
| 10,579,855 B2 * | 3/2020 | Zeng | ................ G06K 9/2018 |
| 2017/0153743 A1 | 6/2017 | Kim et al. | |
| 2018/0074627 A1 | 3/2018 | Kong et al. | |
| 2018/0158877 A1 | 6/2018 | Zeng et al. | |
| 2018/0211090 A1 | 7/2018 | Yang | |

FOREIGN PATENT DOCUMENTS

KR  10-1886035 B1  8/2018

* cited by examiner

*Primary Examiner* — Abhishek Sarma
(74) *Attorney, Agent, or Firm* — Sughrue Mion, PLLC

(57) ABSTRACT

A method of setting light sources in a display panel for optical fingerprint recognition is provided. The method includes driving a portion of light sources disposed to correspond to a fingerprint recognition window which is a partial region of a display panel based on initial light source setting values, obtaining initial calibration data based on reflected light of an object received by a fingerprint recognition sensor through the fingerprint recognition window while driving the portion of the light sources; and determining final light source setting values such that powers for driving light sources of different colors among the portion of the light sources are different, the final light source setting values being determined to minimize contrast of an interference signal included in the initial calibration data.

20 Claims, 28 Drawing Sheets

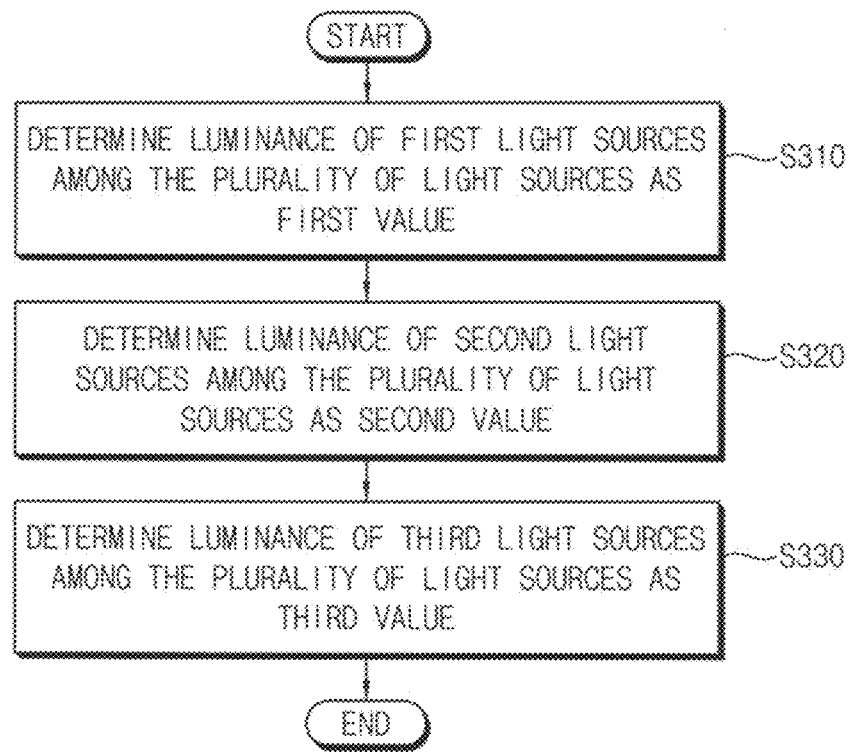

METHOD OF SETTING LIGHT SOURCES IN DISPLAY PANEL FOR OPTICAL FINGERPRINT RECOGNITION AND METHOD OF PERFORMING OPTICAL FINGERPRINT RECOGNITION USING THE SAME

CROSS-REFERENCE TO RELATED APPLICATION

This application claims priority under 35 USC § 119 to Korean Patent Application No. 10-2019-0066482, filed on Jun. 5, 2019 in the Korean Intellectual Property Office (KIPO), the contents of which are herein incorporated by reference in their entirety.

BACKGROUND

1. Field

Example embodiments relate generally to semiconductor integrated circuits, and more particularly to methods of setting light sources in display panels for optical fingerprint recognition, and methods of performing optical fingerprint recognition using the methods of setting the light sources.

2. Description of the Related Art

Biometric information is widely used in personal authentication because of its invariability and uniqueness. One type of biometric information is a fingerprint. Fingerprint recognition may be performed conveniently and serves as an excellent way of determining the identity of a person. Optical fingerprint recognition obtains a fingerprint image based on differences in light reflected by ridges and valleys of a finger. However, obtaining an accurate fingerprint image has proven to be difficult because the differences in reflected light tend to be very small.

SUMMARY

It is an aspect to provide a method of setting light sources in a display panel for optical fingerprint recognition capable of supporting efficient optical fingerprint recognition.

It is another aspect to provide a method of performing optical fingerprint recognition using the method of setting the light sources.

According to an aspect of one or more example embodiments, there is provided a method of setting light sources in a display panel for optical fingerprint recognition, the method comprising driving a portion of light sources among a plurality of light sources included in the display panel based on initial light source setting values, the portion of the light sources being disposed to correspond to a fingerprint recognition window which is a partial region of the display panel; obtaining initial calibration data based on reflected light of an object received by a fingerprint recognition sensor through the fingerprint recognition window while driving the portion of the light sources based on the initial light source setting values; and determining final light source setting values such that powers for driving light sources of different colors among the portion of the light sources are different, the final light source setting values being determined to minimize contrast of an interference signal included in the initial calibration data.

According to another aspect of one or more example embodiments, there is provided a method of setting light sources in a display panel for optical fingerprint recognition, the method comprising driving a portion of light sources among a plurality of light sources included in the display panel based on initial light source setting values, the portion of the light sources being disposed to correspond to a fingerprint recognition window which is a partial region of the display panel; obtaining initial calibration data based on reflected light of an object received by a fingerprint recognition sensor through the fingerprint recognition window while driving the portion of the light sources based on the initial light source setting values; and determining final light source setting values such that powers for driving light sources at different positions among the portion of light sources are different, the final light source setting values being determined to optimize a magnitude of an interference signal included in the initial calibration data.

According to another aspect of one or more example embodiments, there is provided a method of performing optical fingerprint recognition, the method comprising obtaining light source setting values and calibration data; displaying, in a fingerprint recognition mode, a fingerprint recognition window on a partial region of a display panel based on the light source setting values; and recognizing, in the fingerprint recognition mode, a fingerprint based on reflected light of the fingerprint received through the fingerprint recognition window and based on the calibration data, wherein obtaining the light source setting values and the calibration data includes driving a portion of light sources disposed to correspond to the fingerprint recognition window among a plurality of light sources included in the display panel based on initial light source setting values; obtaining initial calibration data based on reflected light of an object received by a fingerprint recognition sensor through the fingerprint recognition window while driving the portion of the light sources based on the initial light source setting values; determining final light source setting values such that powers for driving light sources of different colors among the portion of the light sources are different and/or powers for driving light sources at different positions among the some light sources are different, the final light source setting values being determined to minimize contrast of an interference signal included in the initial calibration data and/or to optimize a magnitude of the interference signal included in the initial calibration data, respectively; driving the portion of the light sources based on the final light source setting values; obtaining final calibration data based on reflected light of the object received by the fingerprint recognition sensor through the fingerprint recognition window while driving the portion of the light sources based on the final light source setting values; and storing the final light source setting values and the final calibration data as the light source setting values and the calibration data.

BRIEF DESCRIPTION OF THE DRAWINGS

Illustrative, non-limiting example embodiments will be more clearly understood from the following detailed description taken in conjunction with the accompanying drawings, in which:

FIG. 11 is a flowchart illustrating another example of determining final light source setting values in the method of FIG. 1, according to example embodiments;

DETAILED DESCRIPTION

Figure 1:
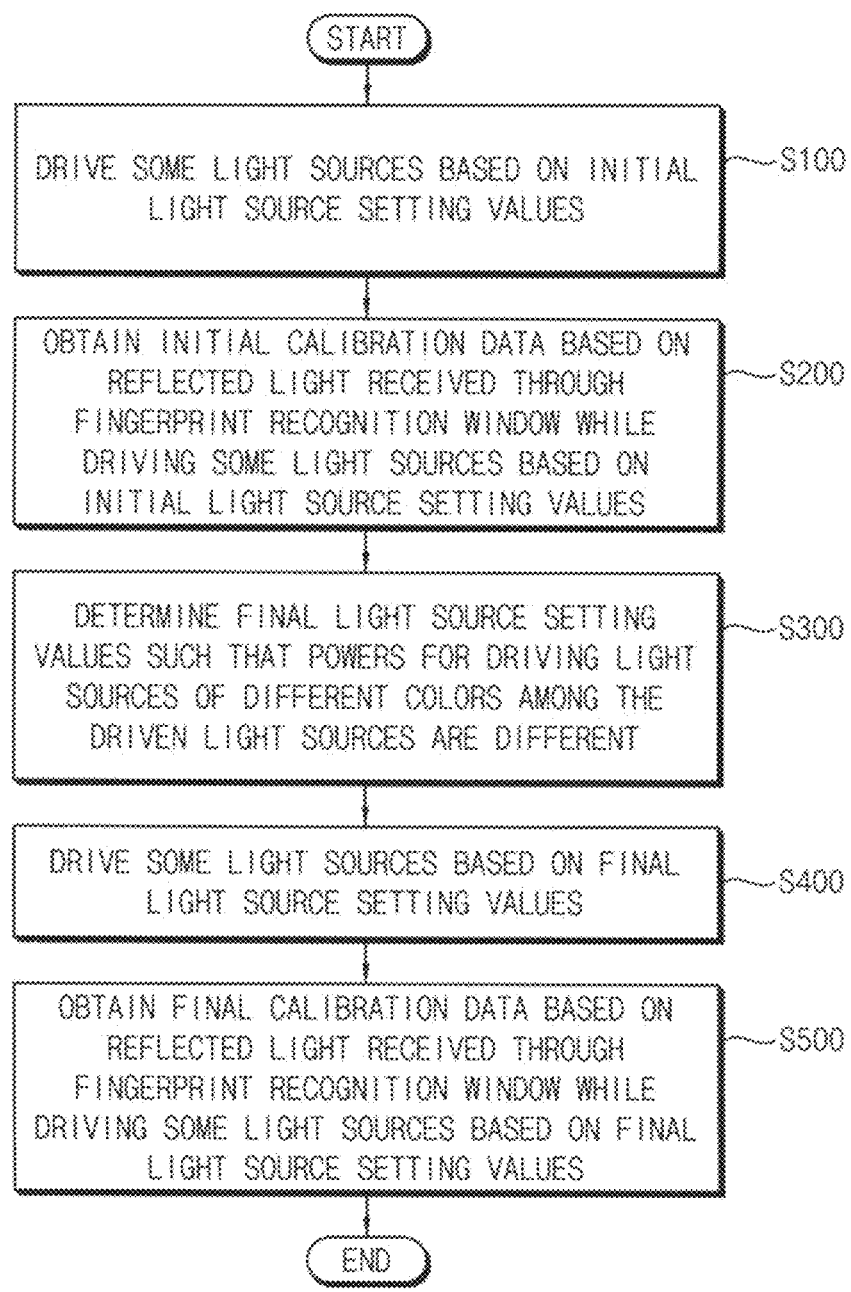
FIG. 1 is a flowchart illustrating a method of setting light sources in a display panel for optical fingerprint recognition according to example embodiments.

Various example embodiments will be described more fully with reference to the accompanying drawings, in which embodiments are shown. Embodiments consistent with the present disclosure may, however, be embodied in many different forms and should not be construed as limited to the embodiments set forth herein. Like reference numerals refer to like elements throughout this application.

In a method of setting the light sources in the display panel for the optical fingerprint recognition and a method of performing optical fingerprint recognition according to example embodiments, light source setting values may be changed such that powers for driving light sources of different colors within a fingerprint recognition window are different and/or such that the powers for driving the light sources at different positions within the fingerprint recognition window are different, thereby minimizing the contrast of an interference signal included in initial calibration data and/or optimizing a magnitude of the interference signal included in the initial calibration data. Final calibration data may then be obtained based on the changed light source setting values. Accordingly, robust fingerprint image restoration may be performed using the final calibration data even if changes occur due to external temperature of the display panel and pressure applied to the display panel and efficient optical fingerprint recognition may be supported.

FIG. 1 is a flowchart illustrating a method of setting light sources in a display panel for optical fingerprint recognition according to example embodiments.

Referring to FIG. 1, a method of setting light sources in a display panel for optical fingerprint recognition according to example embodiments is performed by an electronic device that includes the display panel and a fingerprint recognition sensor. The display panel includes a plurality of light sources, and the fingerprint recognition sensor performs the optical fingerprint recognition using light provided from the plurality of light sources. A detailed configuration of the electronic device will be described with reference to FIGS. 2 through 4.

In the method of setting the light sources in the display panel for the optical fingerprint recognition according to example embodiments, some light sources among the plurality of light sources included in the display panel are driven based on initial light source setting values (step S100). The light sources that are driven are light sources disposed to correspond to a fingerprint recognition window which is a partial region of the display panel. For example, the initial light source setting values may be the same value for all of the driven light sources. In other words, all of the driven light sources may emit light to have the same grayscale value based on the initial light source setting values. In some example embodiments, the initial light source setting values may be the same for a portion of the driven light sources.

While driving the light sources based on the initial light source setting values, initial calibration data is obtained based on reflected light received through the fingerprint recognition window (step S200). The initial calibration data may be obtained from a fingerprint recognition sensor. For example, all of the driven light sources may be substantially simultaneously or concurrently turned on based on the initial light source setting values. Light generated from the driven light sources may be reflected by an object on the fingerprint recognition window, the reflected light of the object may be provided to the fingerprint recognition sensor, and thus the fingerprint recognition sensor may obtain the initial calibration data based on the reflected light of the object. In some example embodiments, the object may be a specific object used for obtaining calibration data, rather than a finger of a user. In some example embodiments, a portion of the driven light sources may be substantially simultaneously or concurrently turned on based on the initial light source setting values.

To minimize contrast of an interference signal included in the initial calibration data, final light source setting values are determined such that powers for driving light sources of different colors among the driven light sources are different (step S300). The contrast of the interference signal may be minimized by the final light source setting values. For example, the final light source setting values may be different values for the light sources of different colors among the driven light sources. In other words, the light sources of different colors may emit light to have different grayscale values based on the final light source setting values.

In some example embodiments, as will be described with reference to FIGS. 7A and 7B, the initial calibration data may include a low frequency component and a high frequency component, and the interference signal may indicate the high frequency component included in the initial calibration data.

Returning to FIG. 1, some light sources may be driven based on the final light source setting values (step S400), and while driving the light sources based on the final light source setting values, final calibration data may be obtained based on reflected light received through the fingerprint recognition window (step S500). For example, all of the driven light sources may be substantially simultaneously or concurrently turned on based on the final light source setting values. As with step S200, the reflected light of the object, which is a specific object used for obtaining calibration data, may be provided to the fingerprint recognition sensor. In some example embodiments, a portion of the driven light sources may be substantially simultaneously or concurrently turned on based on the final light source setting values.

Typically, a display panel has a complicated internal structure including patterns of multi-layered wirings, electrodes, and the like. When a user's finger is placed on a fingerprint recognition window as an object while light sources in the fingerprint recognition window are illuminated, reflected light received through the fingerprint recognition window includes information of a fingerprint that exists on the user's finger and information of the internal structure of the display panel. For example, the internal structure may be a bottom view of the display panel. Thus, in order to obtain only the information of the fingerprint, only information on the internal structure of the display panel, which is an interference component, should be obtained first, and compensation for removing the interference component from an image signal that includes both the interference component and the information of the fingerprint obtained by the user's finger should be performed. Such interference component may be referred to as calibration data. For example, the compensation may be performed by removing the calibration data from the read data from the user's finger, or may be performed by determining compensation data that when added to the read data from the user's finger negates the calibration data.

In the method of setting the light sources in the display panel according to example embodiments, the initial calibration data may be obtained while the light sources within the fingerprint recognition window emit light at the same grayscale, and the light source setting values may be changed such that the powers for driving the light sources of different colors within the fingerprint recognition window are different, thereby minimizing the contrast of the interference signal included in the initial calibration data. The final calibration data may then be obtained while the light sources of different colors within the fingerprint recognition window emit light with different grayscales. Accordingly, a robust fingerprint image restoration may be performed using the final calibration data even if changes occur due to external temperature of the display device, pressure applied to the display panel, etc., and the efficient optical fingerprint recognition may be supported.

Although it is illustrated in step S300 of FIG. 1 that the final light source setting values are determined at once or at one time, example embodiments are not limited thereto, and an operation of determining the final light source setting values may be repeatedly performed until the contrast of the interference signal included in the initial calibration data is minimized, e.g., until the final calibration data has an optimal value for fingerprint image restoration.

Figure 2:
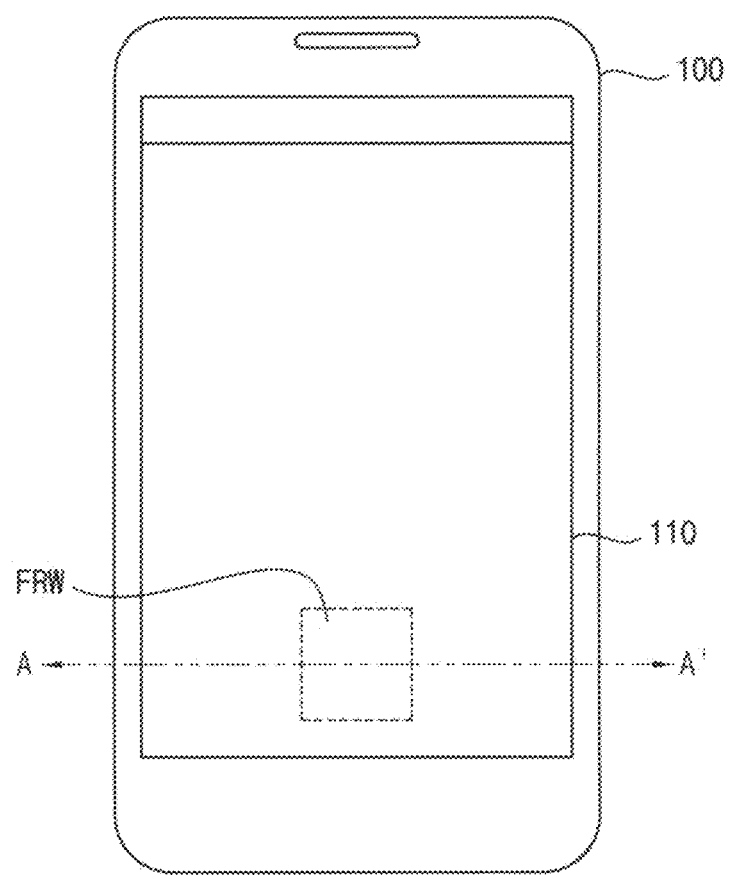
FIG. 2 is a plan view of an electronic device according to example embodiments.

FIG. 2 is a plan view of an electronic device according to example embodiments.

Referring to FIG. 2, an electronic device 100 includes a display panel 110 to interface with a user. The display panel 110 outputs visual information to the user. Although not illustrated in FIG. 2, the electronic device 100 may further include a touch sensor panel for sensing a touch input of the user, and the user may input a signal to the electronic device 100 through the touch sensor panel.

A fingerprint recognition window FRW may be provided on the display panel 110. As will be described with reference to FIG. 3, a fingerprint recognition sensor for fingerprint detection may be disposed to spatially correspond to a location of the fingerprint recognition window FRW. Although the fingerprint recognition window FRW is illustrated as a rectangle in FIG. 2 and subsequent figures, a shape and/or a size of the fingerprint recognition window FRW may be changed according to example embodiments.

In some example embodiments, the electronic device 100 may be or may include any mobile system, such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, etc.

The present disclosure may provide an interface used to detect a fingerprint. For example, a function of fingerprint detection may be performed when the user contacts or approaches the touch sensor panel or the display panel 110. According to the present disclosure, the interface and the fingerprint recognition sensor used for fingerprint detection may share an area on the electronic device 100 with the touch sensor panel and the display panel 110, and thus the interface and the fingerprint recognition sensor may not require an additional area on the electronic device 100. Accordingly, it may be possible to reduce the size of the electronic device 100, or a spare area outside of the display panel 110 that would otherwise be used for the interface may be used for other purpose(s).

Figure 3:
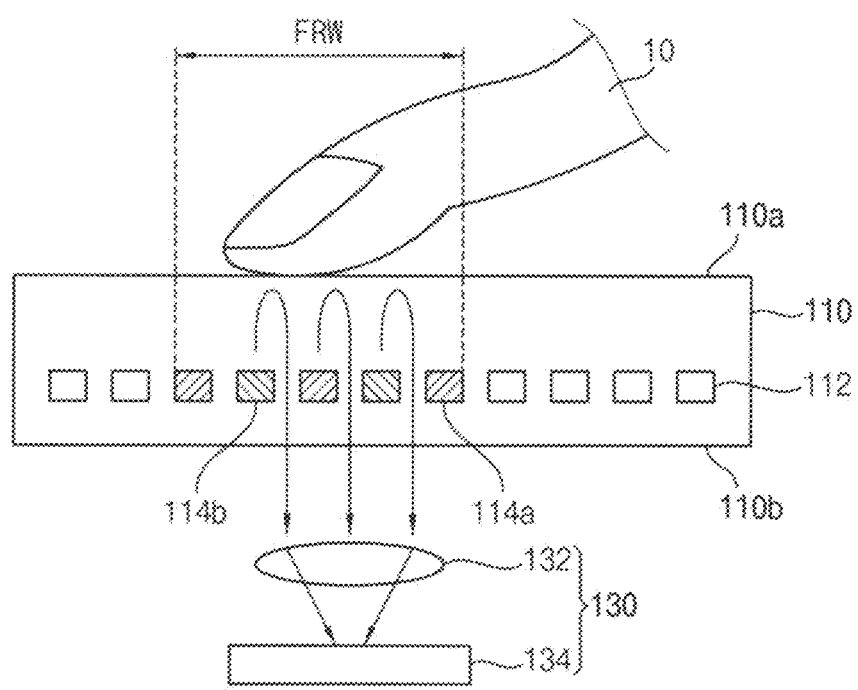
FIG. 3 is a cross-sectional view of an example of the electronic device taken along a line A-A' of FIG. 2, according to example embodiments.

FIG. 3 is a cross-sectional view of an example of the electronic device taken along a line A-A' of FIG. 2, according to example embodiments.

Referring to FIG. 3, the fingerprint recognition window FRW may be provided on a partial region (or portion) of the display panel 110. In some example embodiments the FRW may be displayed on the partial region (or portion) of the display panel 110 in a fingerprint recognition mode. The display panel 110 may include a plurality of light sources 112. For example, as will be described with reference to FIG. 4, the plurality of light sources 112 may be included in a plurality of pixels included in the display panel 110.

Among the plurality of light sources 112, only some light sources 114a and 114b that are disposed to correspond to the fingerprint recognition window FRW may be driven substantially simultaneously in the fingerprint recognition mode. In FIG. 3, the light sources 114a and 114b that are driven and emit light are hatched. In addition, as described with reference to FIG. 1, the powers (or power sources) for driving the light sources of different colors may be differently set. In FIG. 3, the light sources 114a and 114b with different powers (e.g., having different brightness or grayscale values) are indicated by different hatched lines. For example, FIG. 3 shows light sources 114a and 114b in an alternating pattern.

A fingerprint recognition sensor 130 may be disposed under the display panel 110 such that the fingerprint recognition sensor 130 may at least partially overlap the fingerprint recognition window FRW in a vertical direction. In other words, the display panel 110 may include a first surface 110a on which an image is displayed and a second surface 110b opposite to the first surface, and the fingerprint recognition sensor 130 may be disposed under the second surface 110b of the display panel 110.

The fingerprint recognition sensor 130 may include a lens 132 and an image sensor 134. The lens 132 may be disposed under the display panel 110 (e.g., disposed between the display panel 110 and the image sensor 134), and may concentrate reflected light received through the fingerprint recognition window FRW on the image sensor 134. The image sensor 134 may be disposed under the lens 132, and may generate an image signal for an object on a partial region of the FRW based on the reflected light concentrated by the lens 132. The fingerprint recognition sensor 130 may be implemented in the form of a compact camera module (CCM) including the lens 132 and the image sensor 134.

For example, as illustrated in FIG. 3, when a user puts a finger 10 on the fingerprint recognition window FRW, the light generated from the light sources 114a and 114b within the fingerprint recognition window FRW may be reflected by a fingerprint of the finger 10, and the reflected light of the fingerprint may be provided to the fingerprint recognition sensor 130. The fingerprint recognition sensor 130 may capture an image signal for the fingerprint or information associated with a shape of the fingerprint (e.g., a fingerprint image) based on the reflected light of the fingerprint received through the fingerprint recognition window FRW.

For another example, as will be described with reference to FIG. 6, when an object 20 used for obtaining calibration data is placed on the fingerprint recognition window FRW, the light generated from the light sources 114a and 114b within the fingerprint recognition window FRW may be reflected by the object 20, and the reflected light of the object 20 may be provided to the fingerprint recognition sensor 130. The fingerprint recognition sensor 130 may capture an image signal for the calibration data (e.g., an image of the internal structure of the display panel 110) based on the reflected light of the object 20 received through the fingerprint recognition window FRW.

Although not illustrated in FIG. 3, the fingerprint recognition sensor 130 may further include a filter for adjusting a frequency characteristic and/or a polarization characteristic of the reflected light which is to be provided to the image sensor 134.

Figure 4:
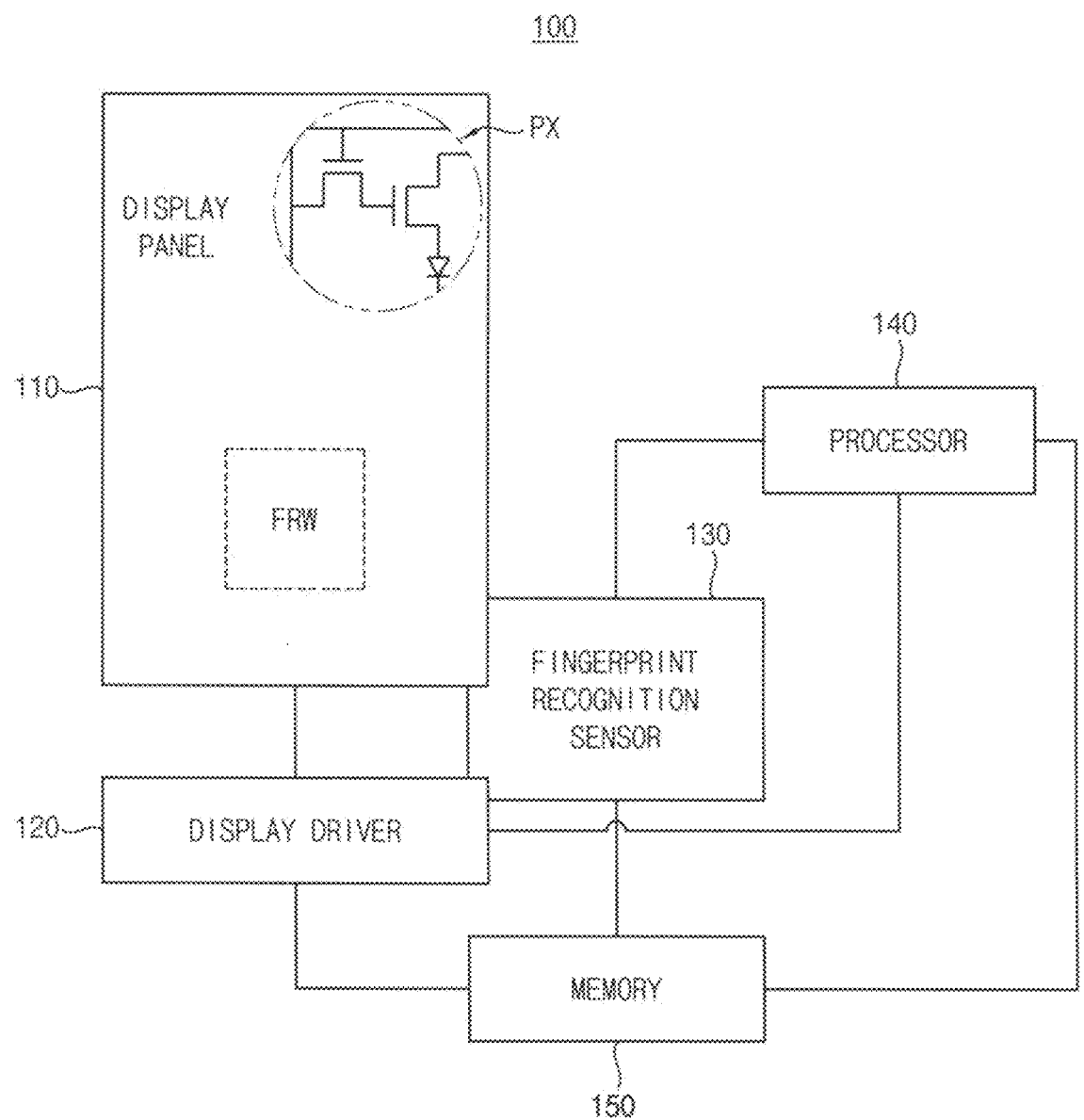
FIG. 4 is a block diagram illustrating an example of the electronic device of FIG. 2, according to example embodiments.

FIG. 4 is a block diagram illustrating an example of the electronic device of FIG. 2, according to example embodiments.

Referring to FIG. 4, the electronic device 100 may include the display panel 110 and the fingerprint recognition sensor 130. The electronic device 100 may further include a display driver 120, a processor 140 and a memory 150.

The display panel 110 outputs visual information to the user. The display panel 110 may include a plurality of pixels which are arranged along rows and columns to display an image. FIG. 4 illustrates one pixel PX as an example. Each pixel may be configured to emit light of a specific color which forms the image. As the plurality of pixels emit light together, the display panel 110 may display a desired or intended image.

In some example embodiments, the display panel 110 may be an electroluminescent display panel. The electroluminescent display panel may be driven with rapid response speed and low power consumption using a light emitting diode (LED) or an organic light emitting diode (OLED) that generates light by recombination of electrons and holes. In comparison with a liquid crystal display panel using a backlight unit, the pixels PX of the electroluminescent display panel may emit light by themselves, and the reflected light received through the fingerprint recognition window FRW may be provided to the fingerprint recognition sensor 130 under the display panel 110 through a space (gap) between the pixels PX. Thus, light emitting diodes or organic light emitting diodes included in the pixels PX may correspond to the light sources included in the display panel according to example embodiments. However, example embodiments are not limited thereto, and the display panel 110 may be any display panel having a structure in which the reflected light received through the fingerprint recognition window FRW may be provided to the fingerprint recognition sensor 130.

The display driver 120 may control operations of the display panel 110 and may drive the display panel 110. For example, the display driver 120 may suitably drive each pixel of the display panel 110 in response to a command of the processor 140 such that the desired or intended image is displayed on the display panel 110. For example, the display driver 120 may partially drive the display panel 110 such that pixels corresponding to the fingerprint recognition window FRW emit light. Although not illustrated in FIG. 4, the display driver 120 may include a data driver, a scan driver, a timing controller, a gamma circuit, etc.

The fingerprint recognition sensor 130 may be used to detect a fingerprint. The fingerprint recognition sensor 130 may generate/output an image signal associated with an object which is on the fingerprint recognition window FRW. For example, the fingerprint recognition sensor 130 may operate to obtain an image signal associated with a fingerprint of a finger which contacts or approaches the fingerprint recognition window FRW. As described with reference to FIG. 3, the fingerprint recognition sensor 130 may include the lens 132 and the image sensor 134.

The fingerprint recognition sensor 130 may provide a function of optical fingerprint recognition or optics-based fingerprint detection. For example, the image sensor 134 included in the fingerprint recognition sensor 130 may include photo-diode(s) which is capable of generating current in response to light.

The processor 140 may control overall operations of the electronic device 100. The processor 140 may process/perform various arithmetic/logical operations based on program code to provide functions of the electronic device 100.

The processor 140 may communicate with the display driver 120, the fingerprint recognition sensor 130 and the memory 150. The processor 140 may control operations of the display driver 120, the fingerprint recognition sensor 130 and the memory 150. The processor 140 may process program code including commands, requests, responses, and/or the like, which are associated with operations of the display driver 120, the fingerprint recognition sensor 130 and the memory 150. For example, the processor 140 may provide a variety of information to the display driver 120, to display the desired or intended image on the display panel 110. For example, the processor 140 may control an operation timing/sequence of the display panel 110 and the fingerprint recognition sensor 130 such that the fingerprint recognition sensor 130 generates the image signals associated with the fingerprint and/or the calibration data. For example, the processor 140 may generate and analyze image information associated with the fingerprint and/or the calibration data based on the image signals output from the fingerprint recognition sensor 130. For example, the processor 140 may store associated data in the memory 150 or may load the associated data from the memory 150.

In some example embodiments, the processor 140 may include one or more special-purpose circuits (e.g., a field programmable gate array (FPGA), application specific integrated chips (ASICs), and/or the like) to perform various operations. For example, the processor 140 may include one or more processor cores which are capable of performing various operations. For example, the processor 140 may be implemented with a general-purpose processor, a special-purpose processor, or an application processor.

The memory 150 may store data related to the operation of the electronic device 100. For example, the memory 150 may store the program code mentioned above, and may store the initial light source setting values, the initial calibration data, the final light source setting values, the final calibration data, etc. for performing the method of setting the light sources in the display panel according to example embodiments.

In some example embodiments, the memory 150 may include at least one of various volatile memories such as a dynamic random access memory (DRAM), a static random access memory (SRAM), or the like, and/or at least one of various nonvolatile memories such as a flash memory, a phase change random access memory (PRAM), a resistance random access memory (RRAM), a magnetic random access memory (MRAM), a ferroelectric random access memory (FRAM), a nano floating gate memory (NFGM), a polymer random access memory (PoRAM), or the like.

In some example embodiments, the display driver 120, the fingerprint recognition sensor 130, the processor 140 and the memory 150 may be respectively implemented with separate circuits/modules/chips. In other example embodiments, on the basis of a function, some of the display driver 120, the fingerprint recognition sensor 130, the processor 140 and the memory 150 may be combined into one circuit/module/chip, or may be further separated into a plurality of circuits/modules/chips.

The electronic device 100 may perform the method of setting the light sources in the display panel described with reference to FIG. 1. For example, the display panel 110 and the display driver 120 under control of the processor 140 may perform steps S100 and S400 in FIG. 1, the fingerprint recognition sensor 130 under control of the processor 140 may perform steps S200 and S500 in FIG. 1, and the processor 140 may perform step S300 in FIG. 1. In addition, the electronic device 100 may perform a method of setting light sources which will be described with reference to FIGS. 13 and 20, and/or a method of performing optical fingerprint recognition which will be described with reference to FIG. 22.

FIGS. 5A, 5B, 5C and 5D are diagrams for describing a method of setting light sources in a display panel for optical fingerprint recognition according to example embodiments.

Figure 5A:
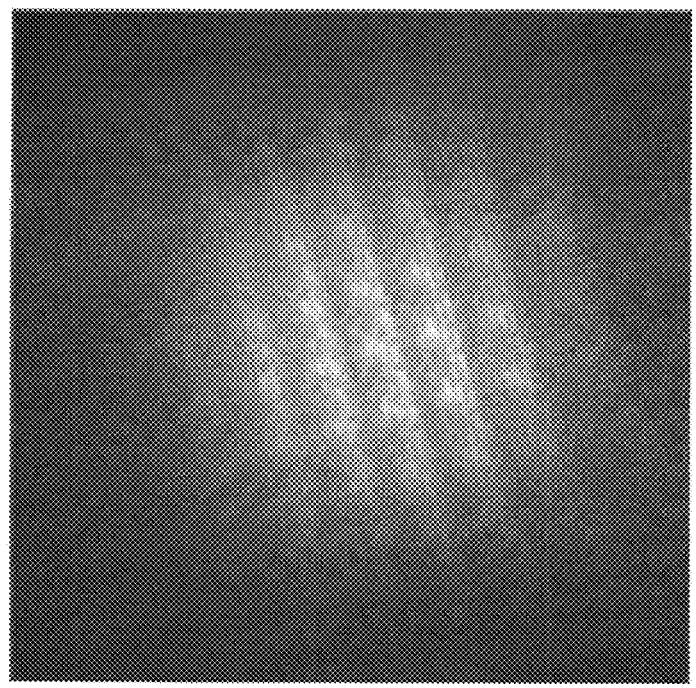
FIGS. 5A, 5B, 5C and 5D are diagrams for describing a method of setting light sources in a display panel for optical fingerprint recognition according to example embodiments.

FIG. 5A illustrates an image obtained based on reflected light by an object used for obtaining calibration data, without a fingerprint (e.g., without a finger of a user). The image of FIG. 5A may correspond to calibration data (e.g., the initial calibration data) obtained by a fingerprint recognition sensor, and may include only information of an internal structure of a display panel.

Figure 5B:
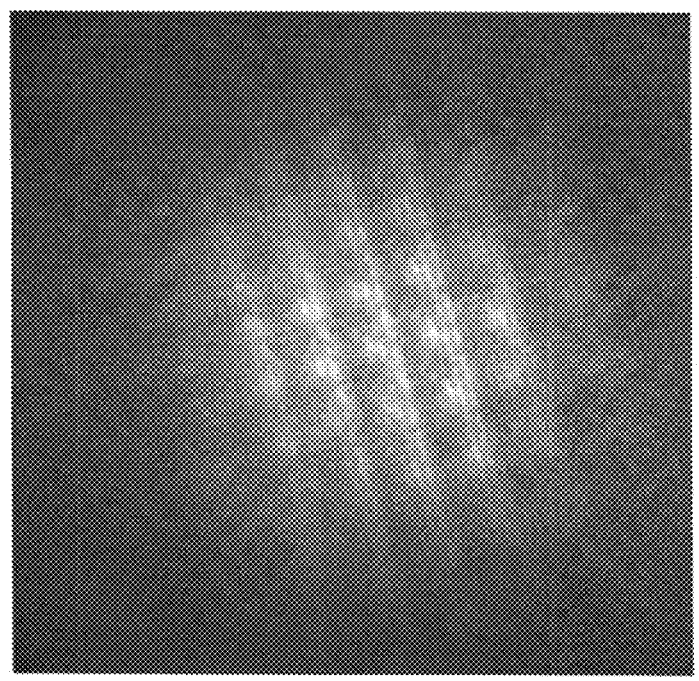

FIG. 5B illustrates an image obtained based on reflected light by the fingerprint. The image of FIG. 5B may also be obtained by the fingerprint recognition sensor, and may include both information of the fingerprint and the information of the internal structure of the display panel.

Figure 5C:
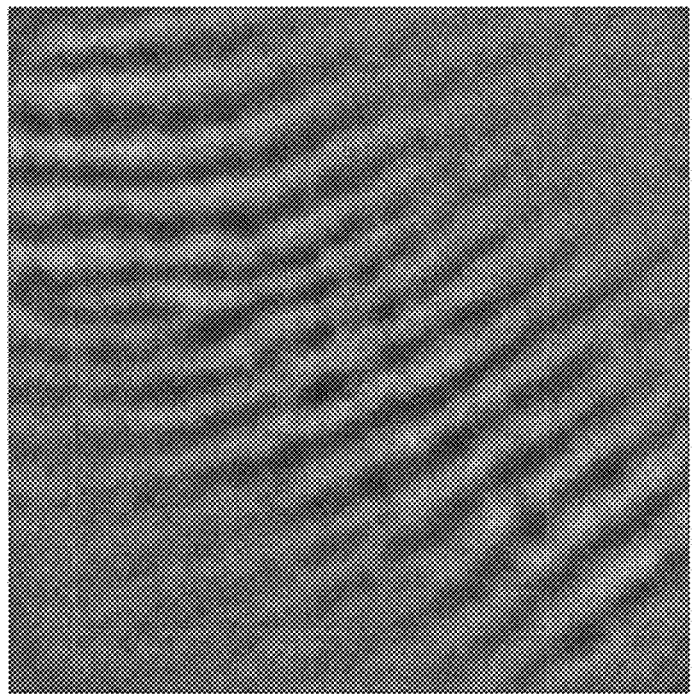
Figure 5D:
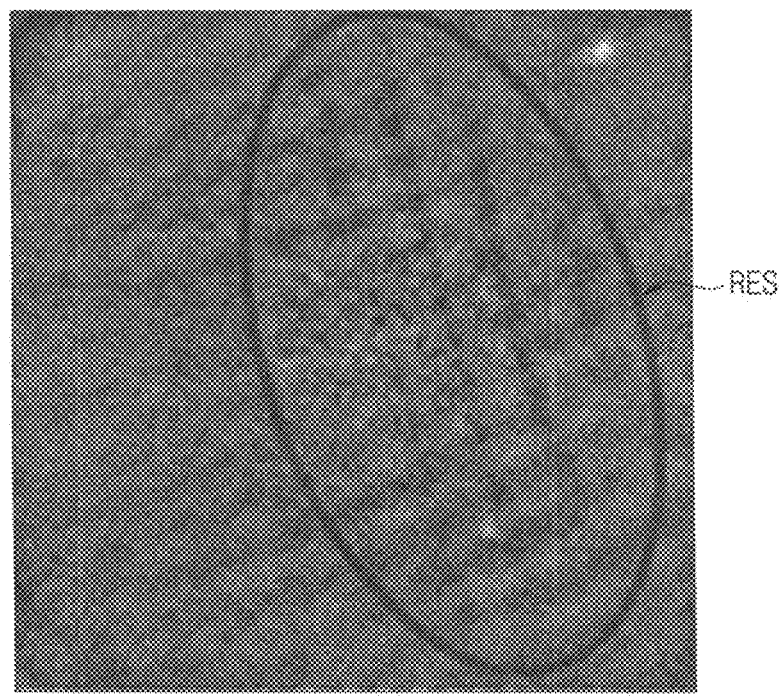

FIGS. 5C and 5D illustrate examples of a pure fingerprint image obtained based on the images of FIGS. 5A and 5B. As described with reference to FIG. 1, a first image (e.g., the image of FIG. 5A) including only a pure interference component without a fingerprint may be obtained first, a second image (e.g., the image of FIG. 5B) including both the fingerprint and the interference component may be obtained next, and then a pure fingerprint image may be obtained by performing compensation to remove the interference component. For example, the pure fingerprint image may be obtained by performing a simple face subtraction to obtain a difference between the second image and the first image.

As illustrated in FIG. 5C, a pure fingerprint image in which the interference component is completely removed may be obtained. However, as illustrated in FIG. 5D, a residual component RES may remain or may be left without the interference component being completely removed. For example, when the finger of the user is placed on the fingerprint recognition window, the interference component may vary depending on temperature of the display panel and/or pressure applied to the display panel. Particularly, deformation (e.g., rotation, scaling, translation, etc.) may occur on the interference component in the second image (i.e., FIG. 5B), and thus the residual component RES may occur because there is a spatial mismatch between the interference component in the first image (FIG. 5A) and the interference component in the second image (FIG. 5B).

To minimize such residual component RES, the powers of the light sources within the fingerprint recognition window may be adjusted to minimize the contrast of the interference signal included in the initial calibration data as described above with reference to FIG. 1, or the powers of the light sources within the fingerprint recognition window may be adjusted to optimize a magnitude of the interference signal included in the initial calibration data as will be described above with reference to FIG. 13.

FIGS. 6, 7A, 7B and 7C are diagrams for describing an example of driving some light sources based on initial light source setting values and an example of obtaining initial calibration data in the method of FIG. 1, according to example embodiments.

Figure 6:
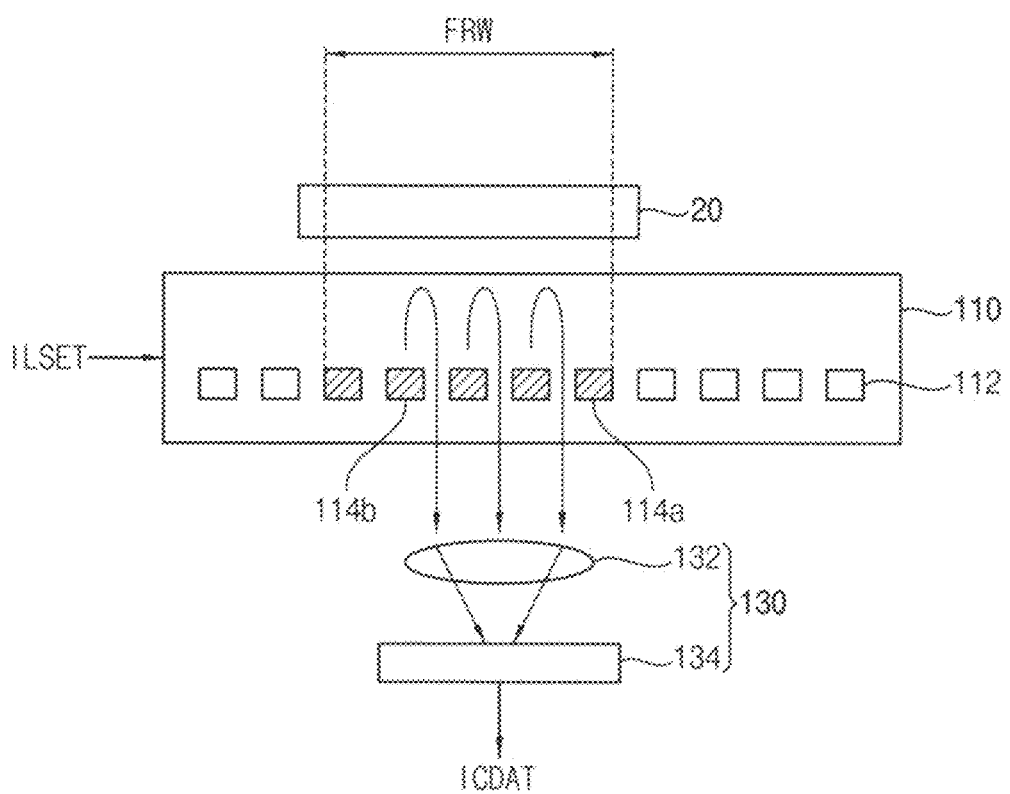
FIGS. 6, 7A, 7B and 7C are diagrams for describing an example of driving some light sources based on initial light source setting values and obtaining initial calibration data in the method of FIG. 1, according to example embodiments.

Referring to FIGS. 1 and 6, the some light sources 114a and 114b that are disposed to correspond to the fingerprint recognition window FRW may be substantially simultaneously turned on based on initial light source setting values ILSET, and initial calibration data ICDAT may be obtained based on light emitted from the some light sources 114a and 114b and reflected by an object 20.

As described with reference to FIG. 1, the initial light source setting values ILSET may be the same value for all of the turned on light sources 114a and 114b, and all of the turned on light sources 114a and 114b may emit light to have the same grayscale value based on the initial light source setting values ILSET, and thus all of the light sources 114a and 114b that emit light are indicated by the same hatched line in FIG. 6. According to example embodiments, the initial light source setting values ILSET may be stored in the memory 150 in FIG. 4 and provided from the memory 150, or may be provided from the processor 140 in FIG. 4.

The object 20 may be a specific object used for obtaining calibration data, rather than a finger of the user. For example, to facilitate acquisition of the initial calibration data ICDAT associated with the internal structure of the display panel, the object 20 may be any object of white flatness and high reflectivity without bending. According to example embodiments, the initial calibration data ICDAT may be provided to and stored in the memory 150, or may be provided to the processor 140 to be used to determine the final light source setting values.

Figure 7A:
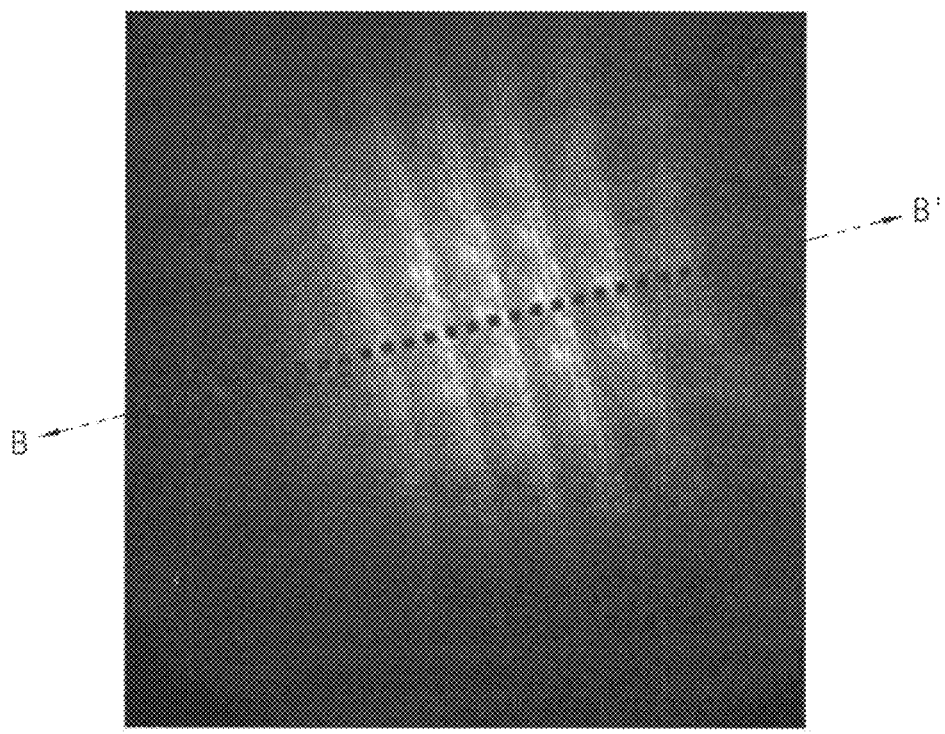

FIG. 7A illustrates an image corresponding to the initial calibration data ICDAT of FIG. 6 obtained by the fingerprint recognition sensor 130. FIG. 7B illustrates a luminance change occurring along a line B-B' in the image of FIG. 7A. In FIG. 7B, an X-axis represents a position along the line B-B' in FIG. 7A, and a Y-axis represents luminance at a corresponding position.

Figure 7B:
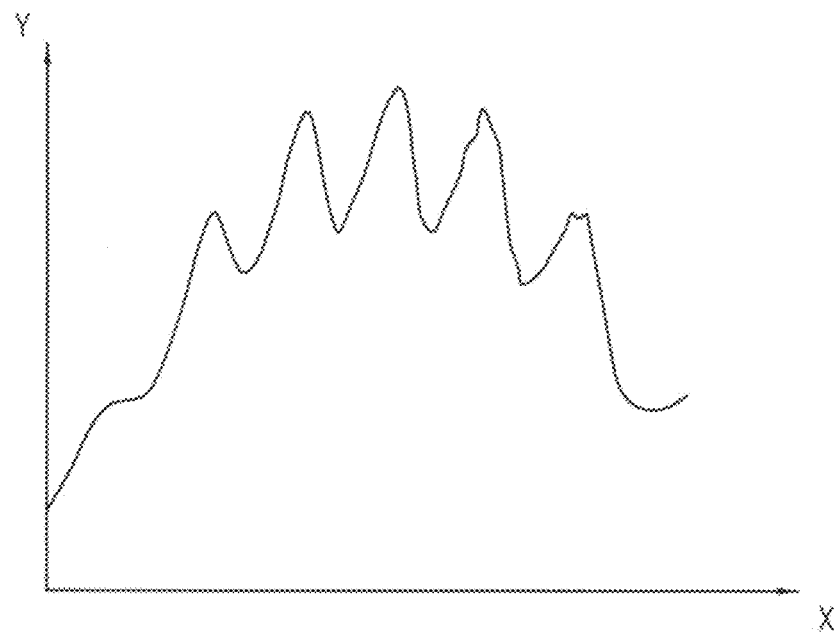

As illustrated in FIGS. 7A and 7B, the initial calibration data ICDAT may include a low frequency component and a high frequency component. The low frequency component may represent an overall change in luminance by a relatively bright center and a relatively dark edge in the image of FIG. 7A. The high frequency component may represent a local luminance change (e.g., fluctuation) where light and dark portions are alternately repeated at a center of the image of FIG. 7A. The high frequency component may be generated by the internal structure of the display panel 110 (e.g., reflected light may or may not pass through the patterns). Since the high frequency component has a frequency similar to that of the fingerprint signal by ridges and valleys of the fingerprint, it may be difficult to remove only the high frequency component.

Figure 7C:
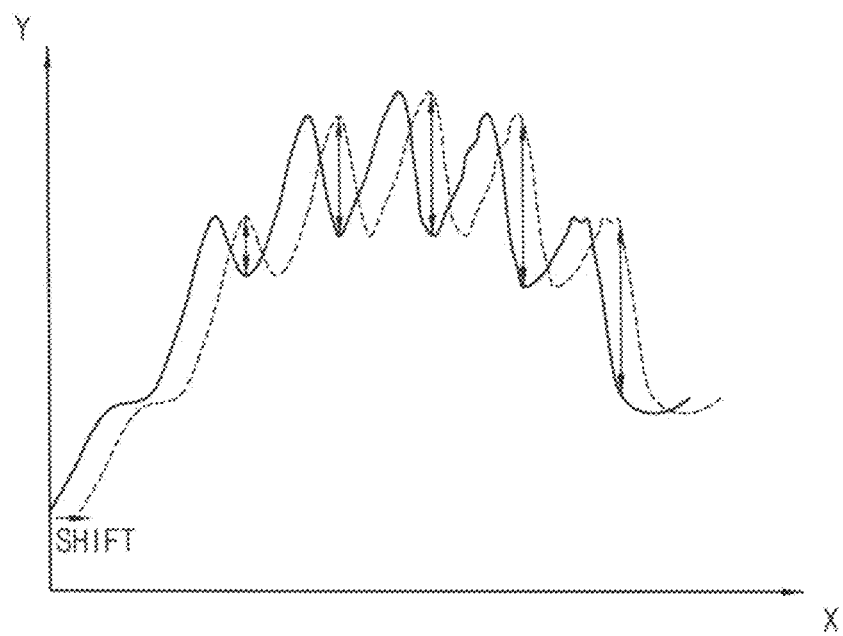

FIG. 7C illustrates that the residual component RES in FIG. 5D may occur when the initial calibration data ICDAT is used as it is. In FIG. 7C, a solid line represents the interference signal included in the initial calibration data ICDAT illustrated in FIG. 7B, and a dotted line represents the interference signal included in the image including both the fingerprint and the interference component. When two interference signals are spatially mismatched or inconsistent, differences between the two interference signals may be relatively large as illustrated by double-headed arrows in FIG. 7C, and the residual component RES may occur as illustrated in FIG. 5D by the differences in FIG. 7C.

Figure 8:
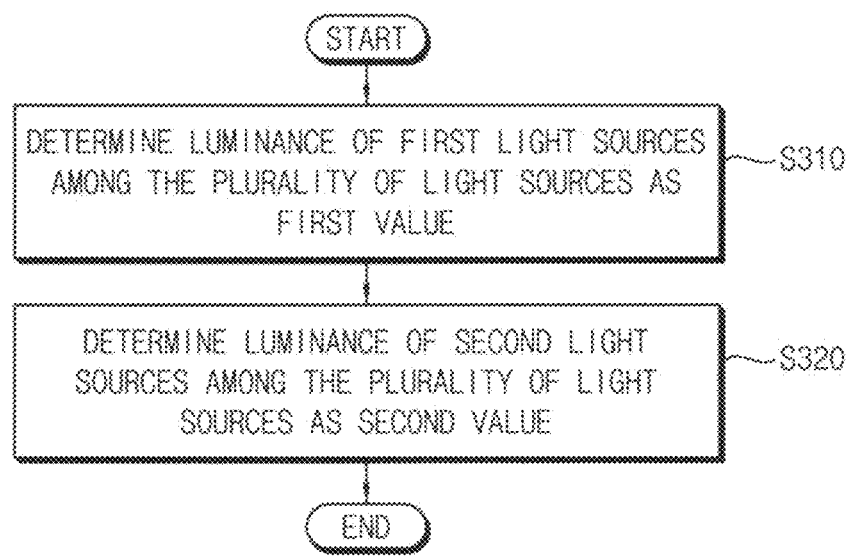
FIG. 8 is a flowchart illustrating an example of determining final light source setting values in the method of FIG. 1, according to example embodiments.

FIG. 8 is a flowchart illustrating an example of determining final light source setting values in the method of FIG. 1, according to example embodiments.

Referring to FIGS. 1 and 8, when determining the final light source setting values such that the powers for driving the light sources of different colors are different (step S300), luminance of first light sources among the some light sources may be determined as a first value (step S310), and luminance of second light sources among the some light sources may be determined as a second value different from the first value (step S320). The first light sources may have a first color, and the second light sources may have a second color different from the first color.

For example, when the display panel includes red, green and blue (RGB) light sources, the first color of the first light sources may be blue, and the second color of the second light sources may be green. However, example embodiments are not limited thereto, and any two of different colors of the plurality of light sources included in the display panel may be selected as the first and second colors, respectively.

FIGS. 9, 10A, 10B and 10C are diagrams for describing an example of driving some light sources based on final light source setting values and obtaining final calibration data in the method of FIG. 1, according to example embodiments. The descriptions repeated with FIG. 6 will be omitted.

Figure 9:
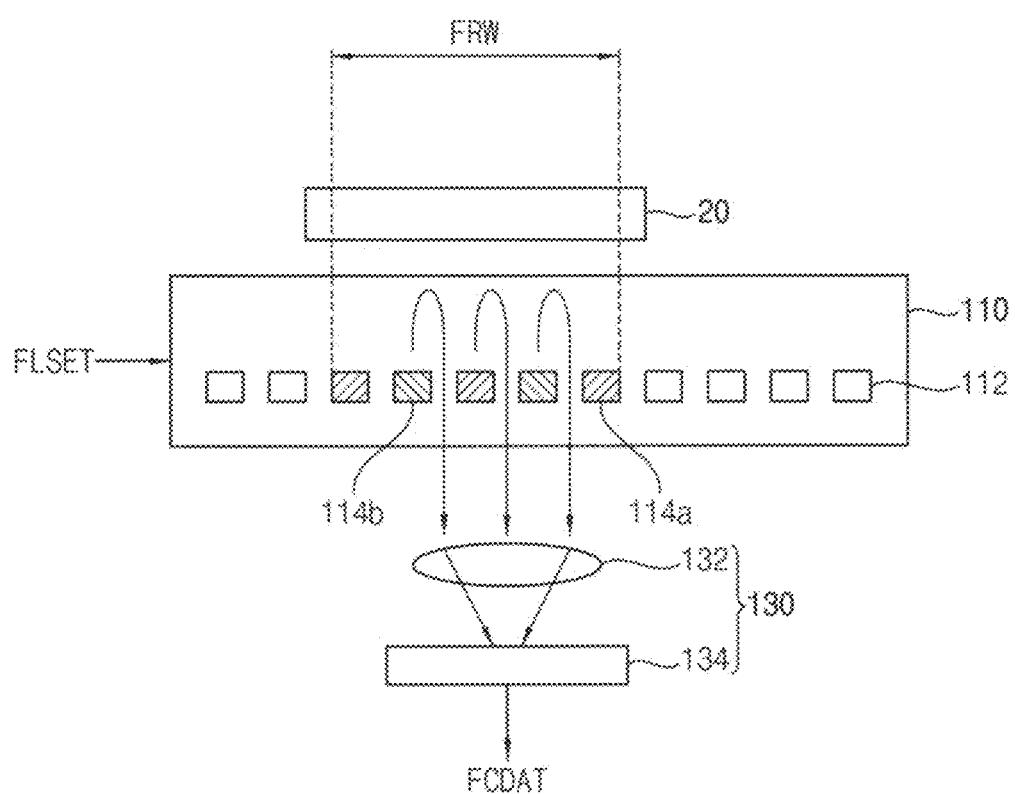
FIGS. 9, 10A, 10B and 10C are diagrams for describing an example of driving some light sources based on final light source setting values and obtaining final calibration data in the method of FIG. 1, according to example embodiments.

Referring to FIGS. 1 and 9, the some light sources 114a and 114b that are disposed to correspond to the fingerprint recognition window FRW may be substantially simultaneously turned on based on final light source setting values FLSET, and final calibration data FCDAT may be obtained based on light emitted from the some light sources 114a and 114b and reflected by the object 20.

As described with reference to FIG. 1, the final light source setting values FLSET may be different values for light sources of different colors among the some light sources 114a and 114b. The light sources 114a and 114b may emit light to have different brightness or grayscale values for each color, and thus the light sources 114a and 114b that emit light with different brightness or grayscale values are indicated by different hatched lines in FIG. 9. According to example embodiments, the final light source setting values FLSET may be stored in the memory 150 in FIG. 4 and provided from the memory 150, or may be provided from the processor 140 in FIG. 4.

Figure 10A:
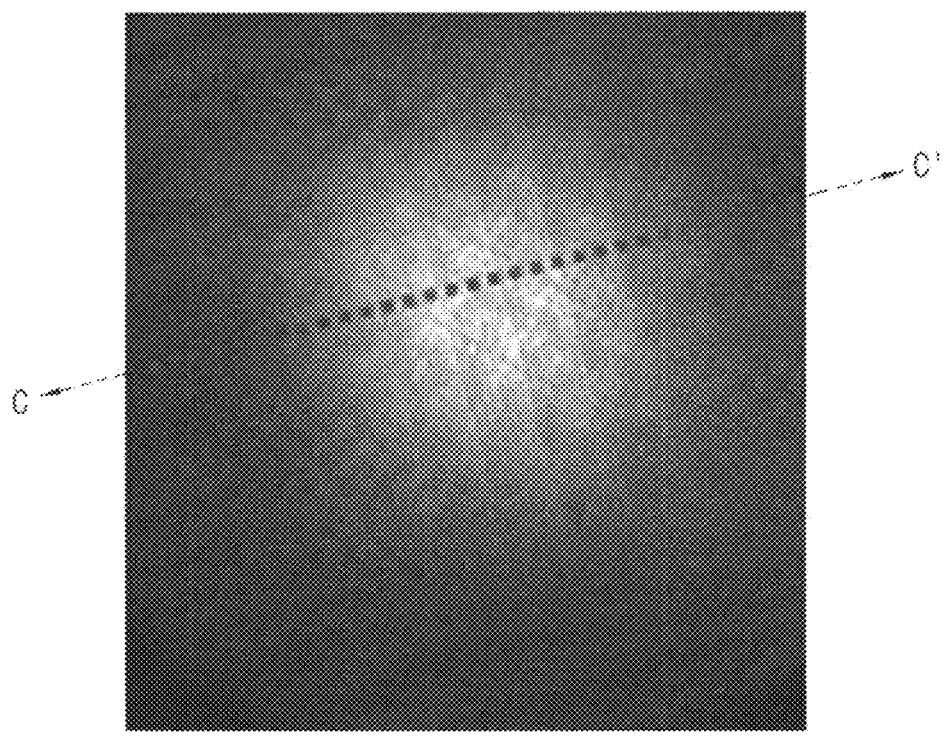
Figure 10B:
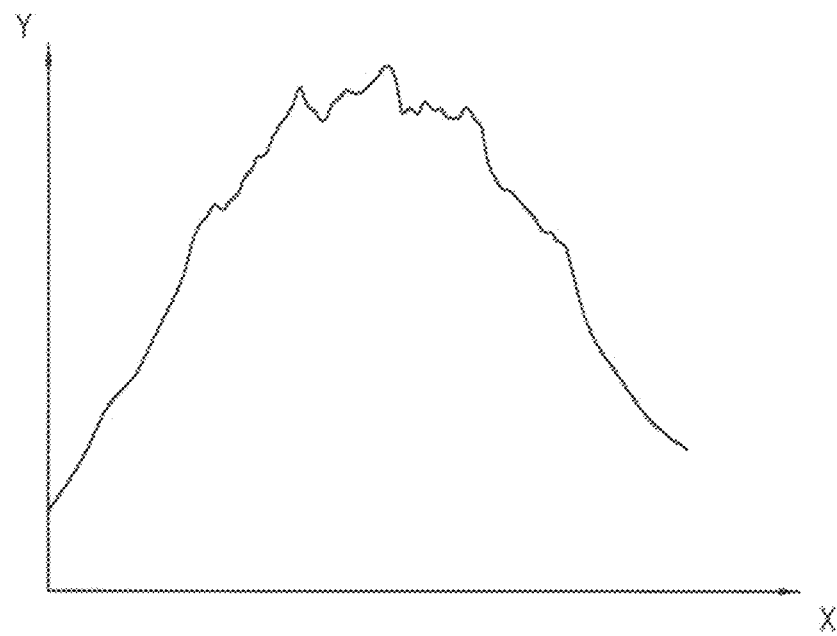

FIG. 10A illustrates an image corresponding to the final calibration data FCDAT of FIG. 9 obtained by the fingerprint recognition sensor 130. FIG. 10B illustrates luminance change occurring along a line C-C' in the image of FIG. 10A. In FIG. 10B, an X-axis represents a position along the line C-C' in FIG. 10A and a Y-axis represents luminance at a corresponding position.

As illustrated in FIGS. 10A and 10B, the final calibration data FCDAT may also include a low frequency component and a high frequency component. In comparison with FIGS. 7A and 7B (e.g., in comparison with the initial calibration data ICDAT), respectively, the low frequency component included in the final calibration data FCDAT is similar to the low frequency component included in the initial calibration data ICDAT, and the high frequency component included in the final calibration data FCDAT is reduced compared with the high frequency component included in the initial calibration data ICDAT.

Figure 10C:
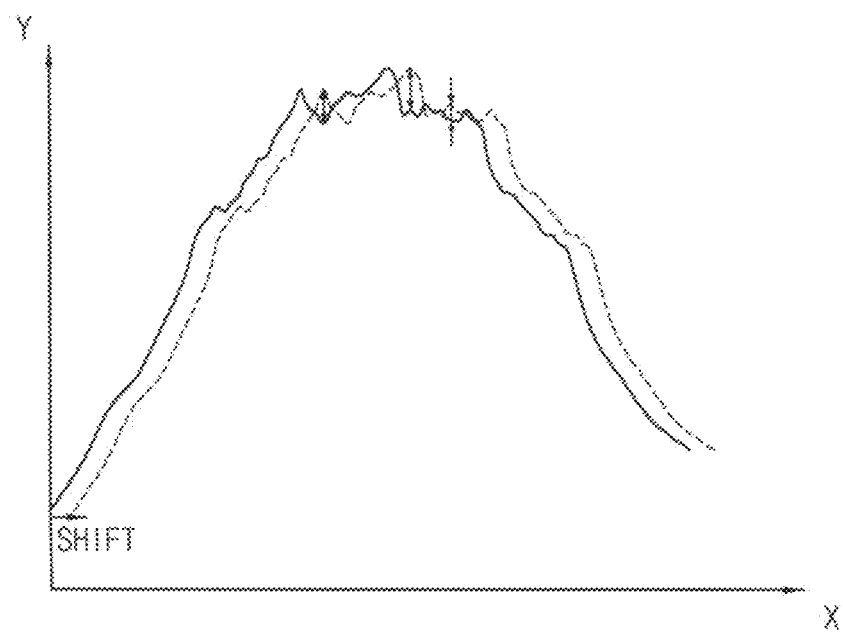

FIG. 10C illustrates that the residual component RES in FIG. 5D may be reduced or eliminated when the final calibration data FCDAT is used. In FIG. 10C, a solid line represents the interference signal included in the final calibration data FCDAT illustrated in FIG. 10B, and a dotted line represents the interference signal included in the image including both the fingerprint and the interference component. In comparison with FIG. 7C, differences between the two interference signals may be relatively small and overall more uniform as illustrated by double-headed arrows in FIG. 10C, even if two interference signals are spatially mismatched or inconsistent. Thus, the residual component RES may be efficiently removed from the fingerprint image when the final calibration data FCDAT is used.

FIG. 11 is a flowchart illustrating another example of determining final light source setting values in FIG. 1, according to example embodiments. The descriptions repeated with FIG. 8 will be omitted.

Referring to FIGS. 1 and 11, when determining the final light source setting values such that the powers for driving the light sources of different colors are different (step S300), steps S310 and S320 in FIG. 11 may be substantially the same as steps S310 and S320 in FIG. 8, respectively. Luminance of third light sources among the turned on light sources may be determined as a third value (step S330). The third value may be different from the first value and the second value. For example, the third light sources may have third color different from the first color and the second color.

For example, when the display panel includes red, green and blue light sources, the first color of the first light sources may be blue, the second color of the second light sources may be green, and the third color of the third light sources may be red. However, example embodiments are not limited thereto, and any three of different colors of the plurality of light sources included in the display panel may be selected as the first, second and third colors, respectively.

Figure 12:
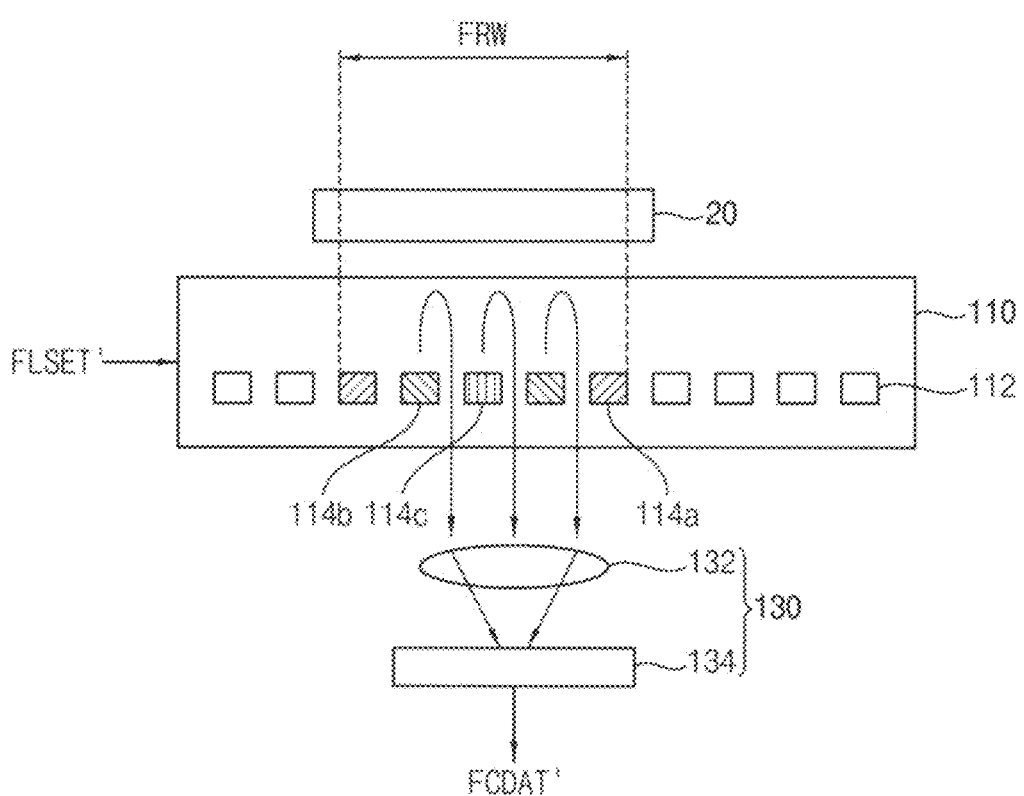
FIG. 12 is a diagram for describing another example of driving some light sources based on final light source setting values and obtaining final calibration data in the method of FIG. 1, according to example embodiments.

FIG. 12 is a diagram for describing another example of driving some light sources based on final light source setting values and obtaining final calibration data in the method of FIG. 1. The descriptions repeated with FIGS. 6 and 9 will be omitted.

Referring to FIGS. 1 and 12, light sources 114a, 114b and 114c that are disposed to correspond to the fingerprint recognition window FRW may be substantially simultaneously turned on based on final light source setting values FLSET', and final calibration data FCDAT' may be obtained based on light emitted from the turned on light sources 114a, 114b and 114c and reflected by the object 20. The light sources 114a, 114b and 114c that have different colors and emit light with different brightness or grayscale values are indicated by different hatched lines in FIG. 12.

In some example embodiments, when the display panel includes red, green and blue light sources, the first, second and third values that represent the luminance of the first, second and third light sources, respectively, may be obtained by Equation 1.

$$(\alpha, \beta, \gamma) = \operatorname{argmin}_{(\alpha,\beta,\gamma)}(\operatorname{cost}_{fn}(\alpha*\text{Blue} + \beta*\text{Green} + \gamma*\text{Red}))$$ [Equation 1]

In Equation 1, $\alpha$, $\beta$ and $\gamma$ denote the first, second and third values, respectively, $\operatorname{cost}_{fn}$ denotes a cost function, and argmin denotes a function of obtaining indices $\alpha$, $\beta$ and $\gamma$ for the cost function to have a minimum value. For example, each of $\alpha$, $\beta$ and $\gamma$ may be a grayscale value of one of grayscale ranges (e.g., 0 to 255 grayscales) of the display panel. For example, the cost function may be a function representing the contrast of the interference signal included in the initial calibration data, and may be a standard deviation or a difference from a low pass filtered signal (e.g., a signal from which the interference signal is removed).

The power of each of the R, G and B channels may be set based on the $\alpha$, $\beta$ and $\gamma$ ratio calculated by Equation 1, and then the set power may be used to drive the light sources in the fingerprint recognition window.

Although example embodiments have been described that the light sources of two or three different colors are set to have different grayscale values for each color, example embodiments are not limited thereto, and example embodiments may be employed or applied to examples in which light sources of at least two different colors of any of a plurality of different colors included in the display panel are set to have different grayscale values for each color. In addition, although example embodiments have been described that all the light sources in the fingerprint recognition window are set to have different grayscale values for each color, example embodiments are not limited thereto, and example embodiments may be employed or applied to examples in which only a portion of the light sources in the fingerprint recognition window are set to have different grayscale values for each color.

Figure 13:
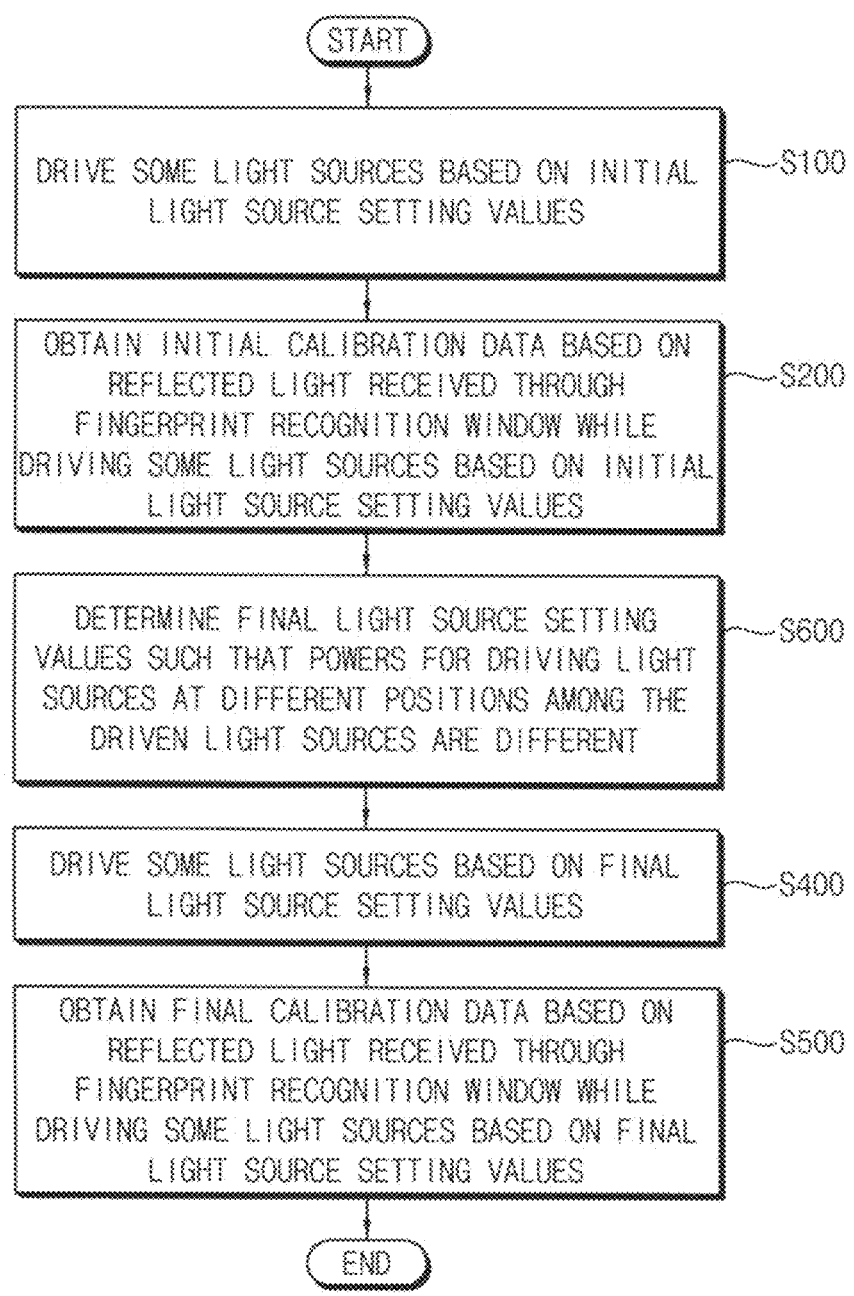
FIG. 13 is a flowchart illustrating a method of setting light sources in a display panel for optical fingerprint recognition according to example embodiments.

FIG. 13 is a flowchart illustrating a method of setting light sources in a display panel for optical fingerprint recognition according to example embodiments. The descriptions repeated with FIG. 1 will be omitted.

Referring to FIG. 13, in a method of setting light sources in a display panel for optical fingerprint recognition according to example embodiments, steps S100, S200, S400 and S500 in FIG. 13 may be substantially the same as steps S100, S200, S400 and S500 in FIG. 1, respectively.

To optimize a magnitude of the interference signal included in the initial calibration data, the final light source setting values are determined such that powers for driving light sources at different positions among the driven light sources are different (step S600). The magnitude of the interference signal included in the initial calibration data is optimized by the final light source setting values. For example, the final light source setting values may be different values for the light sources at different positions among the driven light sources. In other words, the light sources at different positions may emit light to have different grayscale values based on the final light source setting values.

In the method of setting the light sources in the display panel according to example embodiments, the initial calibration data may be obtained while emitting the light sources within the fingerprint recognition window at the same grayscale, and the light source setting values may be changed such that the powers for driving the light sources at different positions within the fingerprint recognition window are different, thereby optimizing the magnitude of the interference signal included in the initial calibration data. After that, the final calibration data may be obtained while emitting the light sources at different positions within the fingerprint recognition window with different grayscales. Accordingly, the robust fingerprint image restoration may be performed using the final calibration data even if changes occur due to temperature of the display panel, pressure applied to the display panel, etc., and efficient optical fingerprint recognition may be supported.

Figure 14:
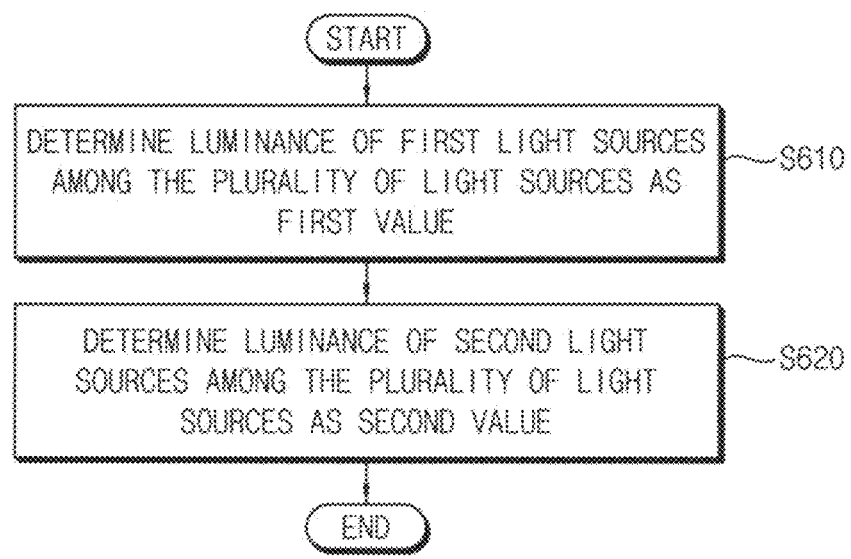
FIG. 14 is a flowchart illustrating an example of determining final light source setting values in the method of FIG. 13, according to example embodiments.

FIG. 14 is a flowchart illustrating an example of determining final light source setting values in the method of FIG. 13, according to example embodiments.

Referring to FIGS. 13 and 14, when determining the final light source setting values such that the powers for driving the light sources at different positions are different (step S600), luminance of first light sources among the some light sources may be determined as a first value (step S610), and luminance of second light sources among the some light sources may be determined as a second value (step S620). The second value may be different from the first value. The first light sources may be disposed in a first region of the partial region, and the second light sources may be disposed in a second region of the partial region different from the first region.

Figure 15:
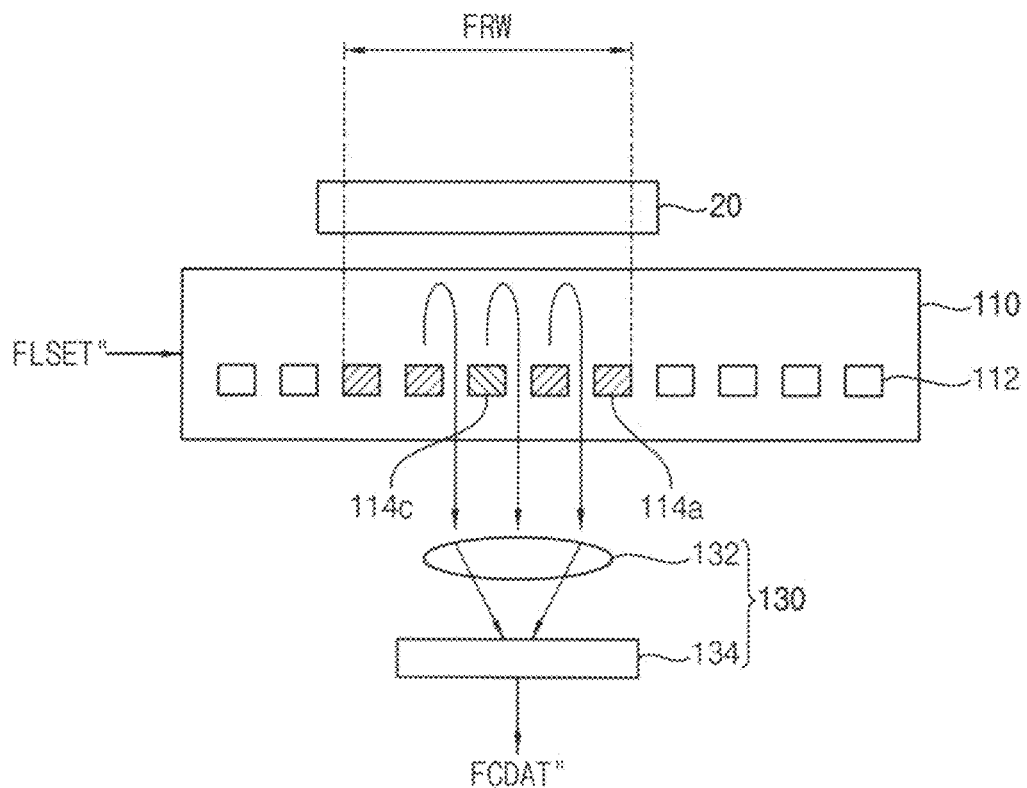
FIG. 15 is a diagram for describing an example of driving some light sources based on final light source setting values and obtaining final calibration data in the method of FIG. 13, according to example embodiments.

FIG. 15 is a diagram for describing an example of driving some light sources based on final light source setting values and obtaining final calibration data in the method of FIG. 13, according to example embodiments. The descriptions repeated with FIGS. 6, 9 and 12 will be omitted.

Referring to FIGS. 13 and 15, the some light sources 114a and 114c that are disposed to correspond to the fingerprint recognition window FRW may be substantially simultaneously turned on based on final light source setting values FLSET", and final calibration data FCDAT" may be obtained based on light emitted from the some light sources 114a and 114c and reflected by the object 20.

As described with reference to FIG. 13, the final light source setting values FLSET" may be different values for light sources at different positions among the some light sources 114a and 114c. The light sources 114a and 114c may emit light to have different brightness or grayscale values for each position, and thus the light sources 114a and 114c that emit light with different brightness or grayscale values are indicated by different hatched lines in FIG. 15.

Figure 16:
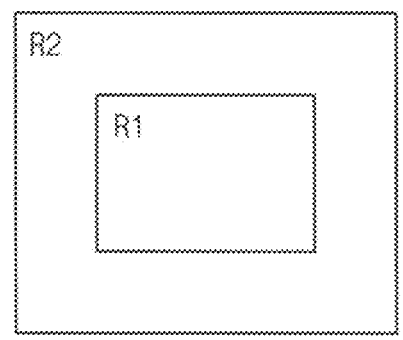
FIG. 16 is a diagram for describing an example of determining final light source setting values in the method of FIG. 13, according to example embodiments.

FIG. 16 is a diagram for describing an example of determining final light source setting values in the method of FIG. 13, according to example embodiments.

Referring to FIGS. 14 and 16, a first region R1 in which the first light sources are disposed may be a central portion of the fingerprint recognition window FRW, and a second region R2 in which the second light sources are disposed may be an edge portion (or peripheral portion) of the fingerprint recognition window FRW that surrounds the central portion. For example, the first light sources may be set to have a relatively low grayscale value or luminance (e.g., set to be relatively dark).

Figure 17:
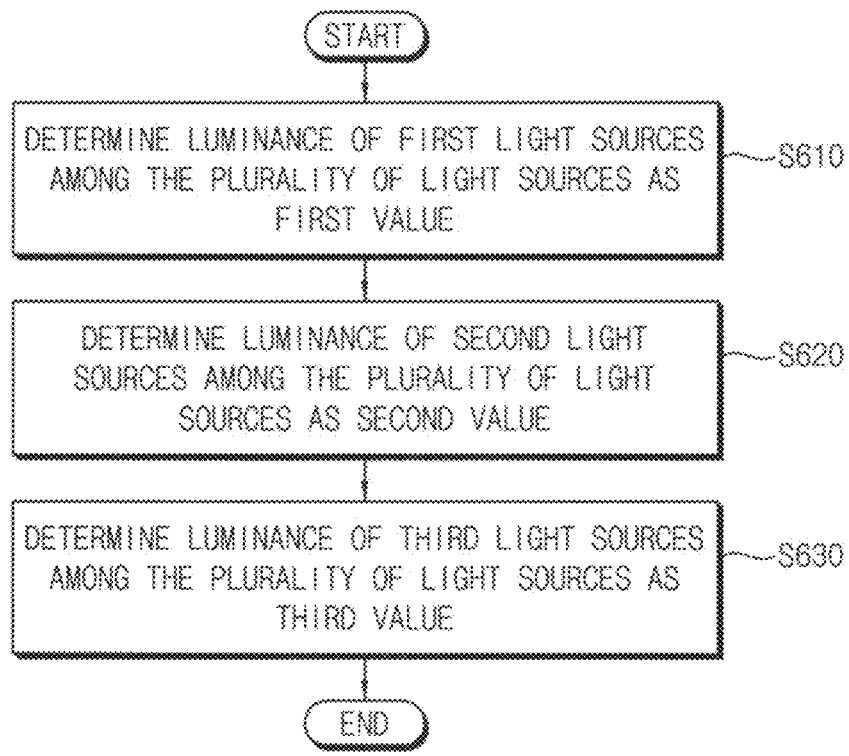
FIG. 17 is a flowchart illustrating another example of determining final light source setting values in the method of FIG. 13, according to example embodiments.

FIG. 17 is a flowchart illustrating another example of determining final light source setting values in the method of FIG. 13, according to example embodiments. The descriptions repeated with FIG. 14 will be omitted.

Referring to FIGS. 13 and 17, when determining the final light source setting values such that the powers for driving the light sources at different positions are different (step S600), steps S610 and S620 in FIG. 17 may be substantially the same as steps S610 and S620 in FIG. 14, respectively. Luminance of third light sources among the turned on light sources may be determined as a third value (step S630). The third value may be different from the first value and the second value. For example, the third light sources may be disposed in a third region of the partial region different from the first region and the second region. An operation of obtaining the final calibration data by driving the first, second and third light sources may be similar to that described with reference to FIG. 12.

Figure 18:
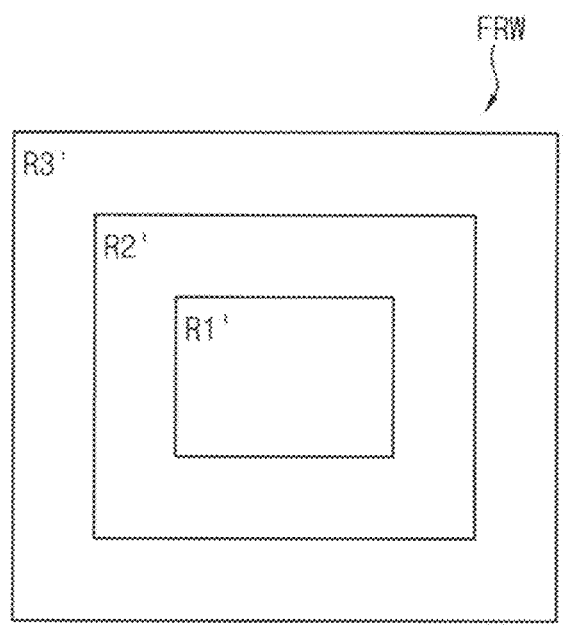
FIGS. 18 and 19 are diagrams for describing another example of determining final light source setting values in the method of FIG. 13, according to example embodiments.
Figure 19:
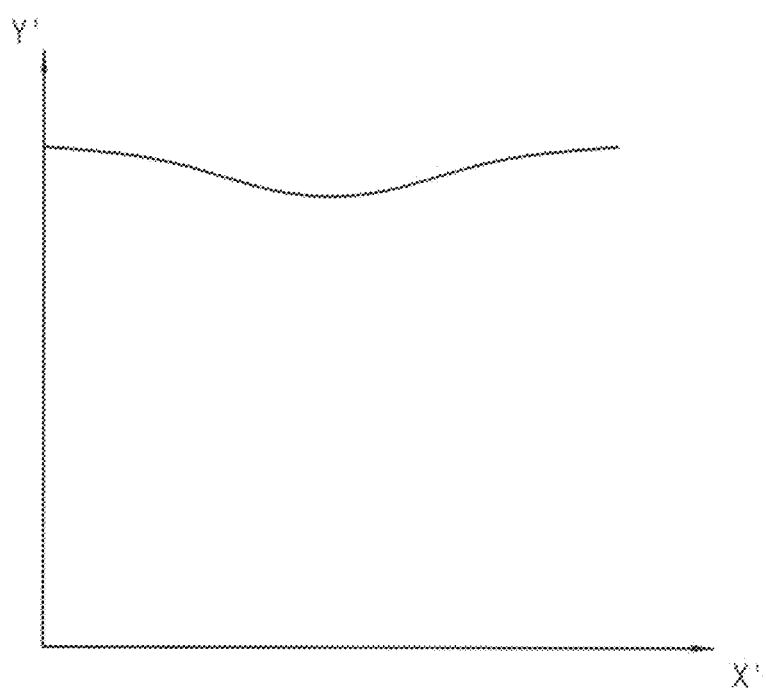

FIGS. 18 and 19 are diagrams for describing another example of determining final light source setting values in the method of FIG. 13, according to example embodiments.

Referring to FIGS. 17 and 18, a first region R1' in which the first light sources are disposed may be a central portion of the fingerprint recognition window FRW, a second region R2' in which the second light sources are disposed may be a middle portion of the fingerprint recognition window FRW that surrounds the central portion, and a third region R3' in which the third light sources are disposed may be an edge portion of the fingerprint recognition window FRW that surrounds the middle portion.

Although example embodiments have been described that the fingerprint recognition window is divided into two or three regions and the light sources in the fingerprint recognition window are set to have different grayscale values for each region, example embodiments are not limited thereto, and example embodiments may be employed or applied to examples in which the fingerprint recognition window is divided into any number of different regions and the light sources in the fingerprint recognition window are set to have different grayscale values for each region. In addition, example embodiments may be employed or extended to examples in which all the light sources in the fingerprint recognition window are set to have different grayscale values for each position. In some example embodiments, all the light sources in the fingerprint recognition window are set to have different grayscale values based on position. In some other example embodiments, each individual turned on light source may have a different grayscale value.

FIG. 19 illustrates a difference in luminance according to positions of light sources in the fingerprint recognition window FRW when all the light sources in the fingerprint recognition window are set to have different grayscale values for each position. In FIG. 19, an X'-axis represents a position of the light sources in the fingerprint recognition window FRW along the line A-A' in FIG. 2, and a Y'-axis represents luminance or grayscale generated by the light source disposed at corresponding position.

As illustrated in FIG. 19, luminance of the light sources in the fingerprint recognition window may be determined to be lower as a light source becomes closer to a center (or central portion). As illustrated in FIG. 7A and other figures, the interference signal may appear relatively large in the center portion, the interference signal may appear relatively small in the edge portion, and the fingerprint signal may also appear to be weak due to vignetting of the lens. To improve this, the powers for driving the light sources may be adjusted according to the position of each of the light sources so that the center portion is relatively dark and the edge portion is relatively bright. For example, in some example embodiments, light sources at respective edge positions may be the same grayscale value, next light sources adjacent to the edge positions may have another grayscale value, etc. In other example embodiments, each individual light source may have a different grayscale value for each position. In still other example embodiments, each individual light source may have a different grayscale value based on position. In still other example embodiments, each individual turned on light source may have a different grayscale value. Thus, it is possible to enhance the fingerprint signal in the edge portion while reducing the magnitude of the interference signal in the center portion.

Although example embodiments have been described that all the light sources in the fingerprint recognition window are set to have different grayscale values for each position, example embodiments are not limited thereto, and example embodiments may be employed or applied to examples in which only a portion of the light sources in the fingerprint recognition window are set to have different grayscale values for each position.

Figure 20:
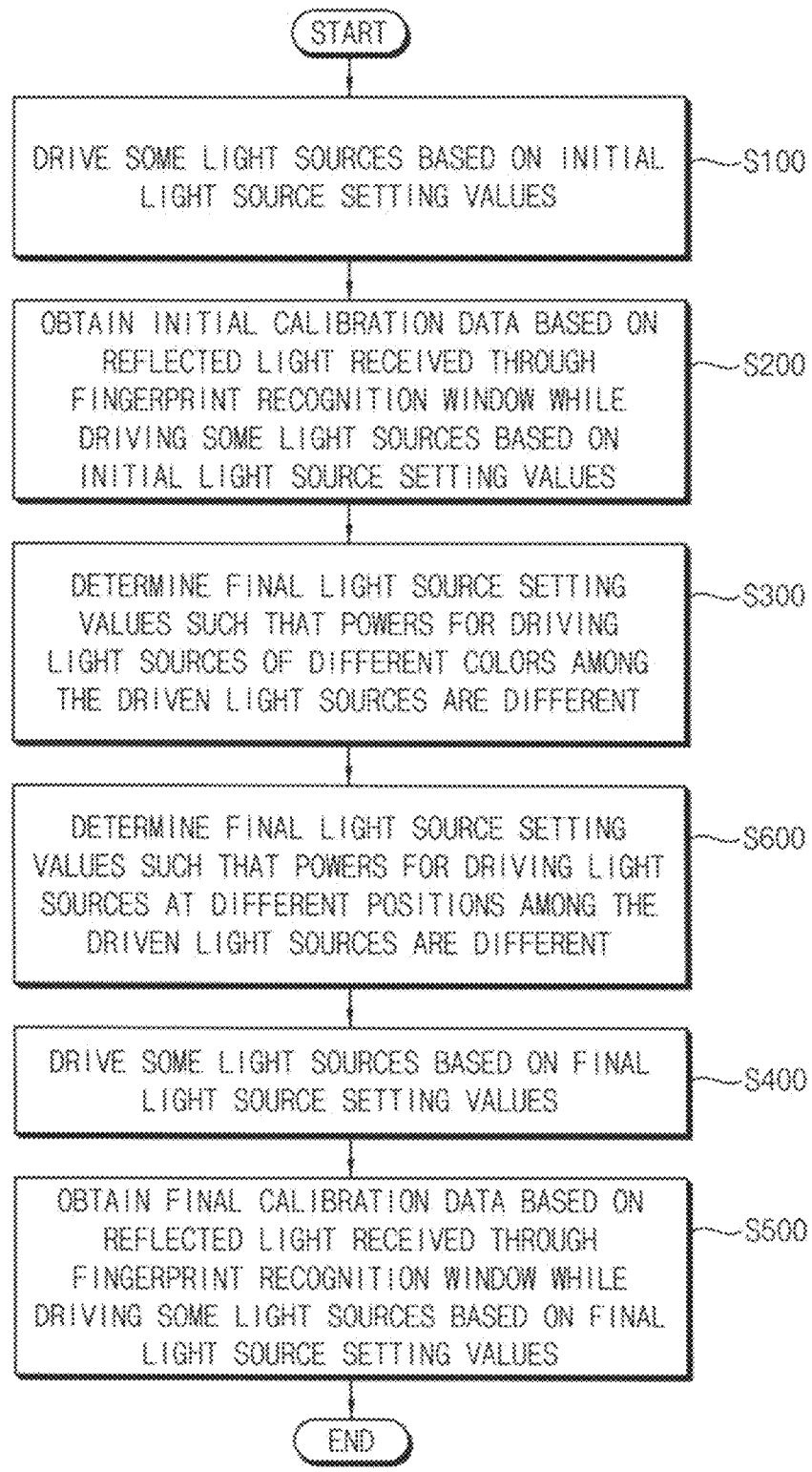
FIG. 20 is a flowchart illustrating a method of setting light sources in a display panel for optical fingerprint recognition according to example embodiments.

FIG. 20 is a flowchart illustrating a method of setting light sources in a display panel for optical fingerprint recognition according to example embodiments. The descriptions repeated with FIGS. 1 and 13 will be omitted.

Referring to FIG. 20, in a method of setting light sources in a display panel for optical fingerprint recognition according to example embodiments, steps S100, S200, S300, S400 and S500 in FIG. 20 may be substantially the same as steps S100, S200, S300, S400 and S500 in FIG. 1, respectively, and step S600 in FIG. 20 may be substantially the same as step S600 in FIG. 13. According to example embodiments, an order of performing steps S300 and S600 may be changed, and steps S300 and S600 may be substantially simultaneously performed.

Figure 21:
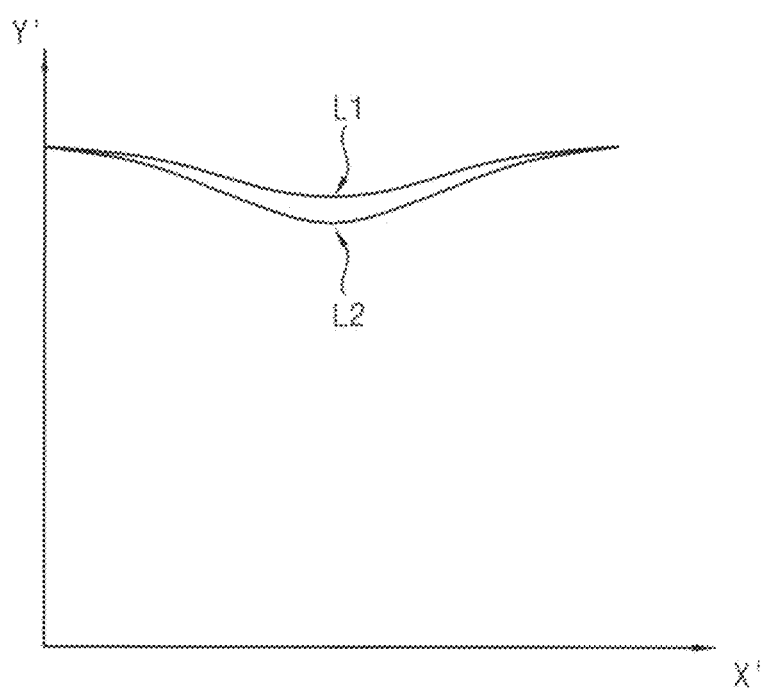
FIG. 21 is a diagram for describing an example of determining final light source setting values in the method of FIG. 20, according to example embodiments.

FIG. 21 is a diagram for describing an example of determining final light source setting values in the method of FIG. 20, according to example embodiments.

FIG. 21 illustrates a difference in luminance according to positions of light sources in the fingerprint recognition window FRW when all the light sources in the fingerprint recognition window are set to have different grayscale values for each color and each position. Luminance L1 of the first light sources having the first color and luminance L2 of the second light sources having the second color may be set differently as described with reference to FIGS. 1 through 12, and luminance of the light sources may be set differently for each position of the light sources as described with reference to FIGS. 13 through 19. For example, green and blue light sources disposed in the center portion may be set to have 230 and 216 grayscales, respectively, and green and blue light sources disposed in the edge portion may be set to have 254 and 255 grayscales, respectively. The brightness and hue of the light sources for each location may be changed together.

Figure 22:
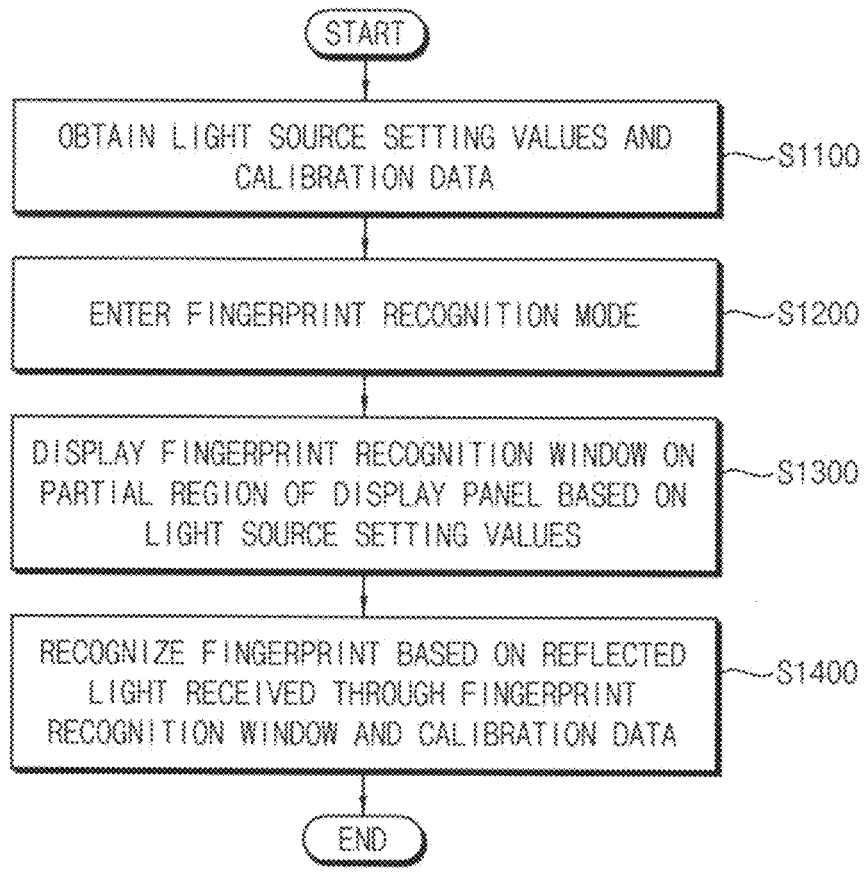
FIG. 22 is a flowchart illustrating a method of performing optical fingerprint recognition according to example embodiments.

FIG. 22 is a flowchart illustrating a method of performing optical fingerprint recognition according to example embodiments.

Referring to FIG. 22, in a method of performing optical fingerprint recognition according to example embodiments, light source setting values and calibration data are obtained (step S1100). Step S1100 may be performed based on the method of setting the light sources in the display panel according to example embodiments described with reference to FIGS. 1 through 21. For example, the final light source setting values may be determined such that the powers for driving the light sources of different colors among the driven light sources within the fingerprint recognition window are different, such that the powers for driving the light sources at different positions among the driven light sources are different, or such that both the powers for driving the light sources of different colors and the powers for driving the light sources at different positions are different. For example, the final calibration data may be obtained based on the final light source setting values, and the final light source setting values and the final calibration data may be stored as the light source setting values and the calibration data, respectively. For example, the light source setting values and the calibration data may be stored in the memory 150 in FIG. 4.

A fingerprint recognition mode is entered (step S1200). The fingerprint recognition mode may be entered based on a request. For example, the request may be associated with a signal or an action which directs to detect a fingerprint.

For example, the request may occur when any input is received from a user by the electronic device 100, when a signal/command is generated in the electronic device 100 based on the received input, and/or the like. For example, the request may occur when the user contacts or approaches any area on the touch sensor panel or the display panel 110 through the object 10 (e.g., the request may occur in response to a touch of the object 10). For example, the request may occur when the object 10 acts specific motion or gesture in the vicinity of the electronic device 100. For example, the request may occur when the electronic device 100 moves in a specific manner. As another example, an application running on the electronic device 100 may initiate the request. However, example embodiments are not limited thereto, and the request may be changed or modified to recognize directing of fingerprint detection.

For example, the request may occur while the electronic device 100 is in an idle state or the display panel 110 is not driven. For example, the request may occur while the display panel 110 is in a stand-by mode. Herein, the stand-by mode may denote an operation mode where the display panel 110 displays a reduced amount of information or a minimal amount of information (e.g., a current time, a date, and/or the like), and may be also called as an "Always ON display (AOD)" mode, an "active display mode", and/or the like. For example, the request may occur while the display panel 110 is in a normal mode. Herein, the normal mode may denote an operation mode where the display panel 110 displays a variety of information according to intention of the user.

The fingerprint recognition window is displayed on a partial region of the display panel based on the light source setting values (step S1300), and the fingerprint is recognized based on reflected light of the fingerprint received through the fingerprint recognition window, and the calibration data (step S1400). The fingerprint recognition mode may then be existed once the fingerprint is recognized. As described above, the fingerprint may be recognized based on the reflected light and the calibration data when the powers for driving the light sources are set to be different from each other by color and/or position. Accordingly, the robust fingerprint image restoration may be performed even if changes occur due to temperature of the display panel, pressure applied to the display panel, etc., and efficient optical fingerprint recognition may be supported.

In some example embodiments, an operation of obtaining the final light source setting values and the final calibration data based on the method of setting the light sources in the display panel according to example embodiments described with reference to FIGS. 1 through 21 may be performed when an electronic device including the display panel and the fingerprint recognition sensor is manufactured. For example, the method of setting the light sources in the display panel according to example embodiments may be performed once at the time of manufacturing the electronic device, and the final light source setting values and the final calibration data may be obtained and stored in the electronic device. After that, an operation of loading the final light source setting values and the final calibration data already stored in the memory 150 may be performed in step S1100. A fingerprint recognition operation of steps S1200, S1300 and S1400 may be performed by loading the stored final light source setting values and the stored final calibration data.

In other example embodiments, since characteristics of the light sources are changed, degraded or deteriorated by usage of the display panel, the operation of obtaining the final light source setting values and the final calibration data based on the method of setting the light sources in the display panel according to example embodiments described with reference to FIGS. 1 through 21 may be periodically performed. For example, the operation of obtaining the final light source setting values and the final calibration data based on the method of setting the light sources in the display panel according to example embodiments described with reference to FIGS. 1 through 21 may be repeatedly performed whenever use time of the display panel exceeds a threshold reference time.

Figure 23:
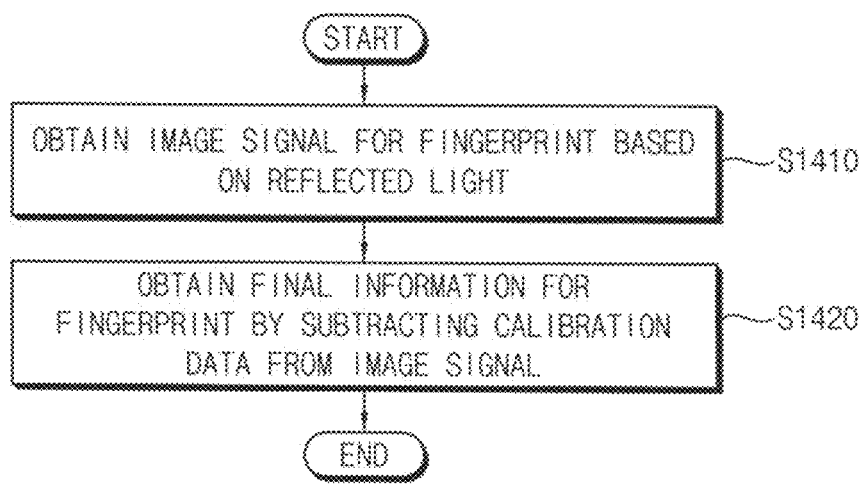
FIG. 23 is a flowchart illustrating an example of recognizing a fingerprint in the method of FIG. 22, according to example embodiments.

FIG. 23 is a flowchart illustrating an example of recognizing a fingerprint in the method of FIG. 22, according to example embodiments.

Referring to FIGS. 22 and 23, when recognizing the fingerprint based on the reflected light of the fingerprint received through the fingerprint recognition window and the calibration data (step S1400), an image signal for the fingerprint may be obtained based on the reflected light (step S1410). For example, the image signal for the fingerprint may be obtained based on the reflected light reflected by the fingerprint and received through the fingerprint recognition window. Final information for the fingerprint may be obtained by subtracting the calibration data from the image signal (step S1420). As described with reference to FIGS. 5C and 5D, the first image (e.g., the image of FIG. 5A) including only the pure interference component without the fingerprint may be obtained first, the second image (e.g., the image of FIG. 5B) including both the fingerprint and the interference component may be obtained next, and then the pure fingerprint image may be obtained by performing the compensation to remove the interference component.

Figure 24:
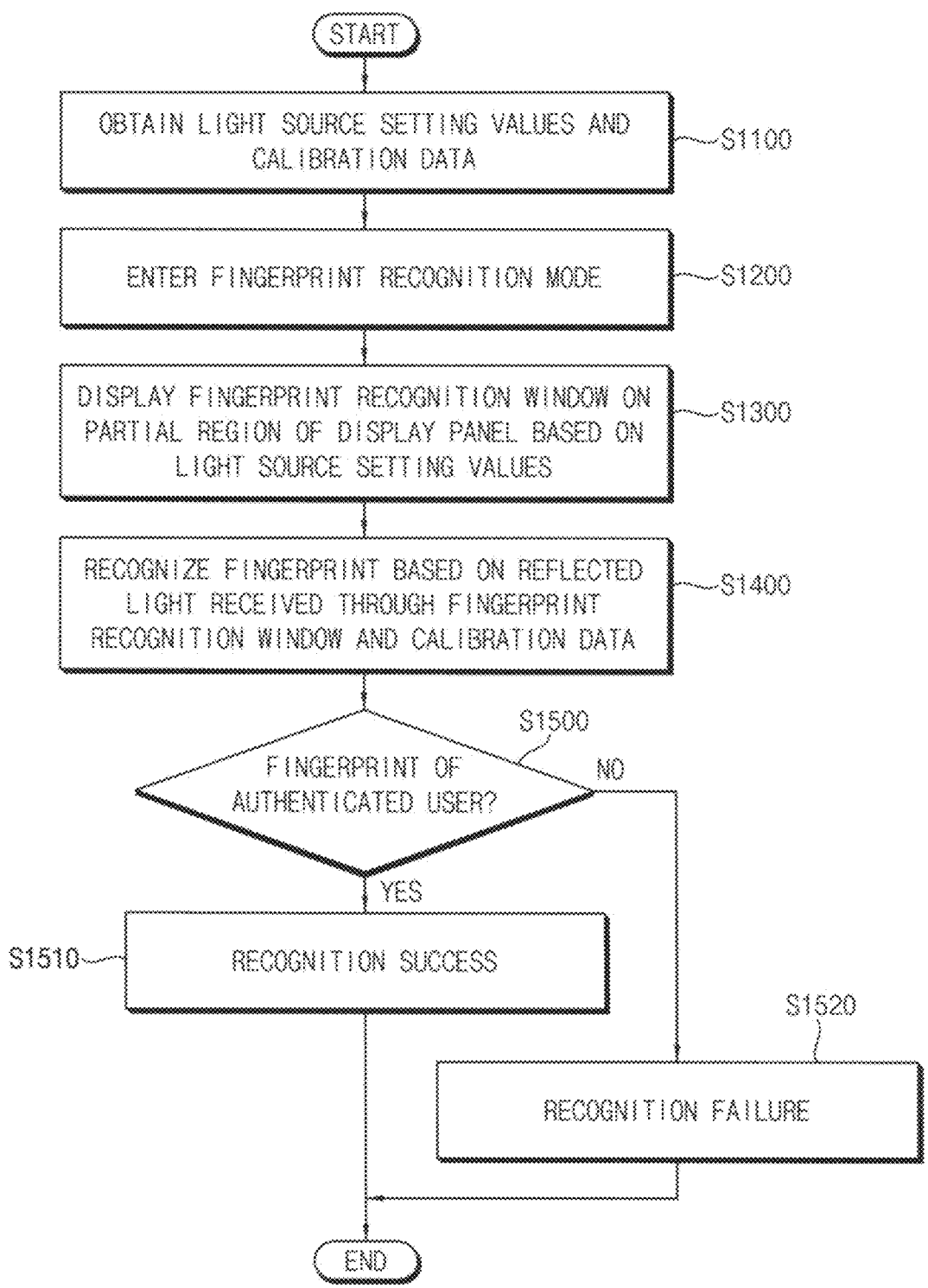
FIGS. 24 and 25 are flowcharts illustrating a method of performing optical fingerprint recognition according to example embodiments.
Figure 25:
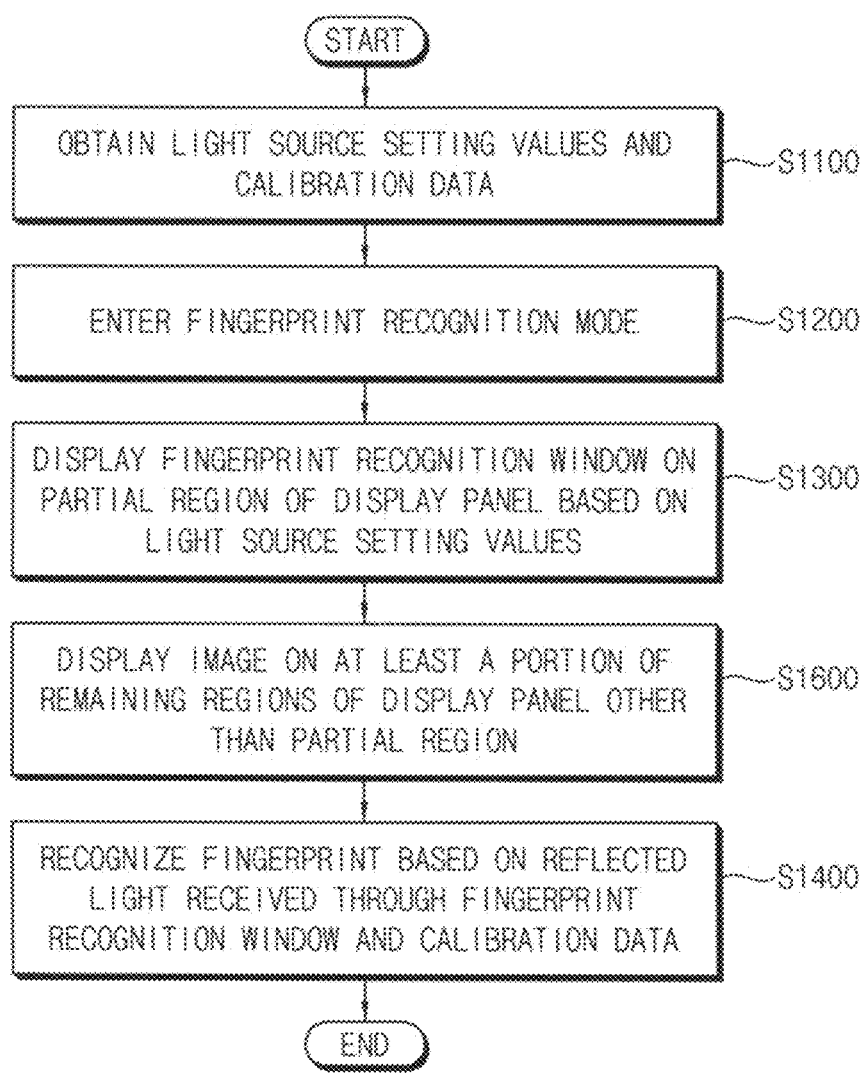

FIGS. 24 and 25 are flowcharts illustrating a method of performing optical fingerprint recognition according to example embodiments. The descriptions repeated with FIG. 22 will be omitted.

Referring to FIG. 24, in a method of performing optical fingerprint recognition according to example embodiments, step S1100, S1200, S1300 and S1400 in FIG. 24 may be substantially the same as step S1100, S1200, S1300 and S1400 in FIG. 22, respectively.

It may be determined whether the fingerprint recognized in the fingerprint recognition mode (i.e., in step 1400) is a fingerprint of an authenticated user (step S1500). For example, the fingerprint of the authenticated user stored in advance and the fingerprint recognized in the fingerprint recognition mode may be compared to determine whether two fingerprints are substantially identical or the same.

When the fingerprint recognized in the fingerprint recognition mode is the fingerprint of the authenticated user (step S1500: YES), it may be determined that the fingerprint recognition is successful (step S1510), and appropriate subsequent operations may be performed.

When the fingerprint recognized in the fingerprint recognition mode is not the fingerprint of the authenticated user (step S1500: NO), it may be determined that the fingerprint recognition has failed (step S1520), and the operation may be terminated. In some example embodiments, the fingerprint recognition operation may be repeated until the number of times that the fingerprint recognition fails exceeds a threshold number.

Referring to FIG. 25, in a method of performing optical fingerprint recognition according to example embodiments, step S1100, S1200, S1300 and S1400 in FIG. 25 may be substantially the same as step S1100, S1200, S1300 and S1400 in FIG. 22, respectively.

An image may be displayed on at least a portion of remaining regions of the display panel other than the partial region in the fingerprint recognition mode (step S1600). Step S1600 may be performed simultaneously with at least one of steps S1300 and S1400. In some example embodiments, an image may also be displayed on the partial region where the fingerprint recognition window is disposed.

Figure 26:
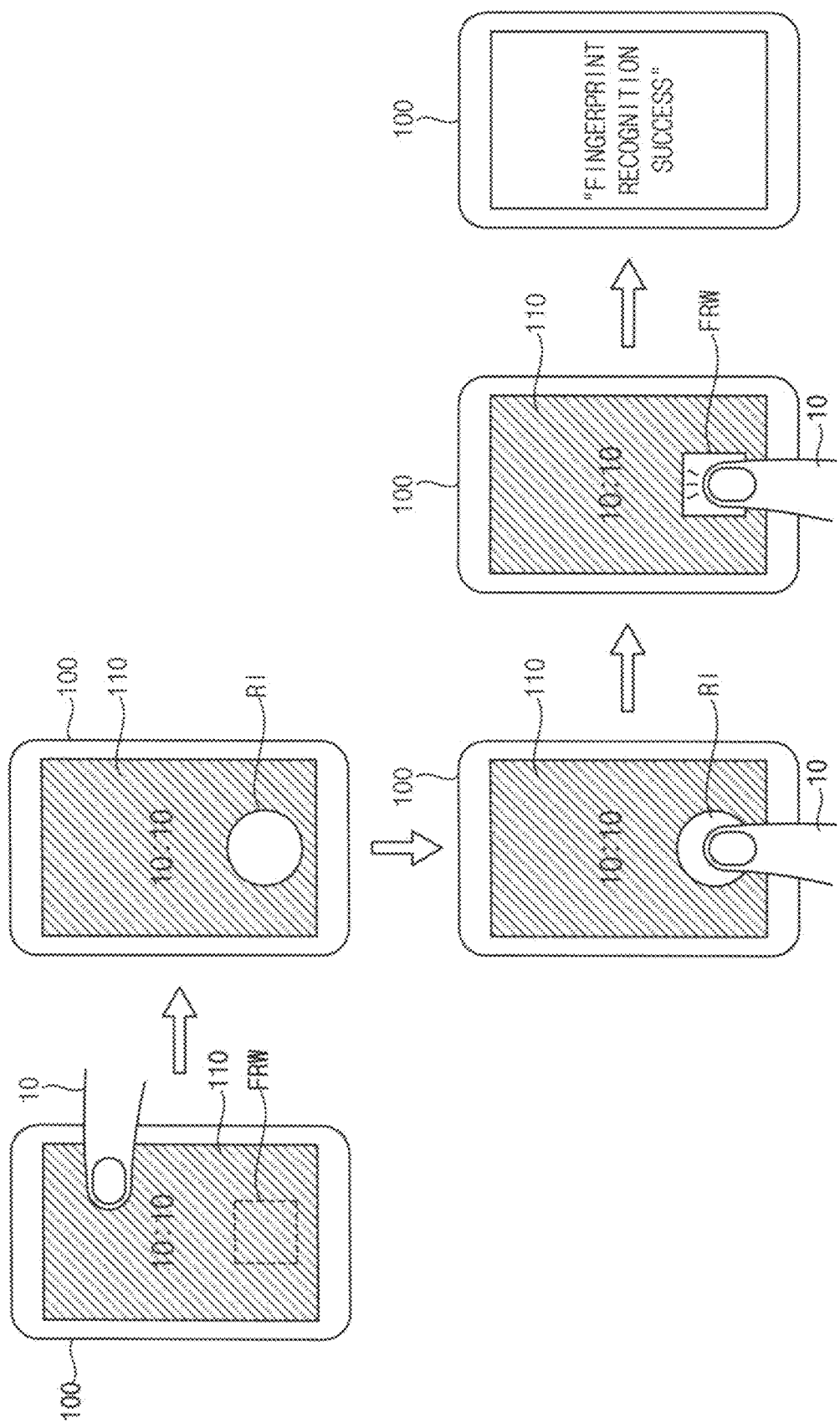
FIG. 26 is a diagram illustrating an example process for a method of performing optical fingerprint recognition according to example embodiments.

FIG. 26 is a diagram illustrating an example process for a method of performing optical fingerprint recognition according to example embodiments. FIG. 26 will be described with reference to the method of FIG. 24 as an example.

Referring to FIG. 26, after obtaining the light source setting values and the calibration data (step S1100), the request may be generated or the request may occur to enter the fingerprint recognition mode (step S1200). For example, the request may occur in response to contact or proximity of the object 10 on or to any area on the display panel 110. For example, the request may occur while the display panel 110 is in a stand-by mode (e.g., while the display panel 110 displays the reduced or the minimal amount of information such as a current time).

For example, the user may not know a location at which the fingerprint recognition sensor 130 is disposed. Thus, in some example embodiments, the user may contact or approach a region other than the fingerprint recognition window FRW through the object 10. The electronic device 100 may determine that a touched area does not coincide with the fingerprint recognition window FRW, and may display a reference image RI by partially driving the display panel 110 under control of the display driver 120. The reference image RI may be displayed to inform the user of the location at which the fingerprint recognition sensor 130 is disposed. The reference image RI may be displayed on some or all portions of the fingerprint recognition window FRW.

After that, the user may contact or approach, through the object 10, the fingerprint recognition window FRW in which the reference image RI is displayed. The electronic device 100 may determine that a touched area coincides with the fingerprint recognition window FRW, and may emit light by partially driving the display panel 110 under control of the display driver 120 (step S1300). The electronic device 100 may generate an image signal associated with the object 10 which is on the fingerprint recognition window FRW, based on the emitted light.

The electronic device 100 may recognize the fingerprint based on the reflected light of the fingerprint received through the fingerprint recognition window FRW and the calibration data (step S1400). The electronic device 100 may determine whether the fingerprint recognized in the fingerprint recognition mode is the fingerprint of the authenticated user (step S1500).

In some example embodiments, the reference image RI may be provided in association with a function of fingerprint detection. For example, since the function of fingerprint detection is associated with an issue of user authentication and security, the function of fingerprint detection may be processed with the highest priority. In some example embodiments, the electronic device 100 may suitably drive the display panel 110 under control of the display driver 120, such that an interface (e.g., the contact or proximity of the object 10) associated with the reference image RI is processed prior to an interface (e.g., a time setting) associated with the stand-by mode. In some cases, the user may contact or approach an area other than the fingerprint recognition window FRW again, even if the reference image RI is displayed. In this case, the electronic device 100 may display an error response to inform the user that a touched area does not coincide with the fingerprint recognition window FRW.

Figure 27:
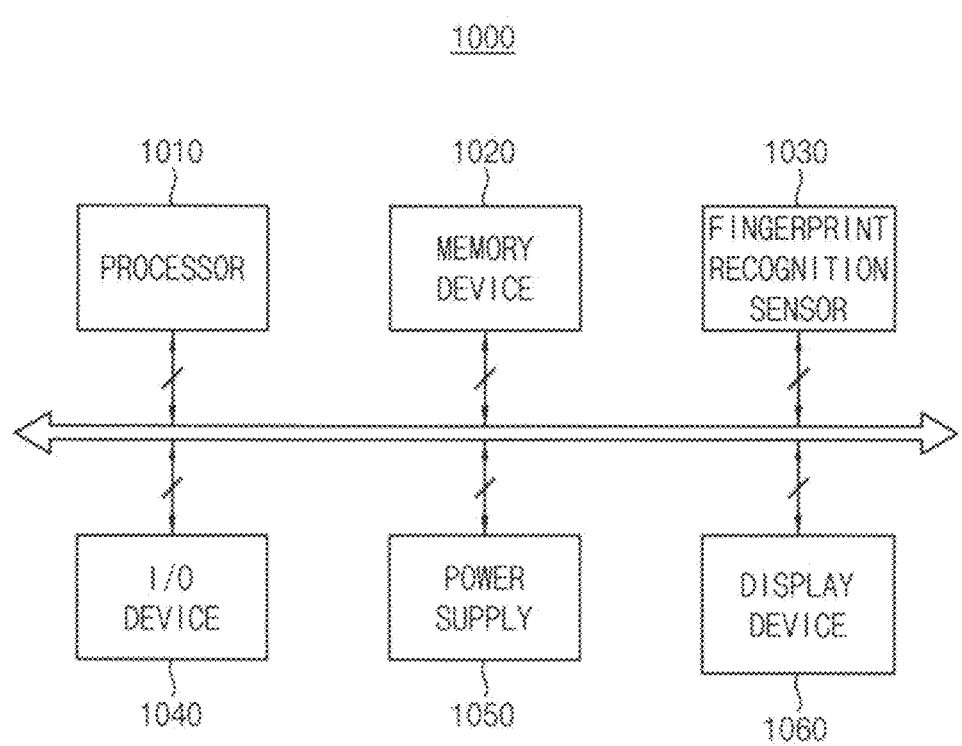
FIG. 27 is a block diagram illustrating an electronic device according to example embodiments.

FIG. 27 is a block diagram illustrating an electronic device according to example embodiments.

Referring to FIG. 27, an electronic device 1000 may include a processor 1010, a memory device 1020, a fingerprint recognition sensor 1030, an input/output (I/O) device 1040, a power supply 1050 and a display device 1060. The electronic device 100 may further include a plurality of ports for communicating a video card, a sound card, a memory card, a universal serial bus (USB) device, other electronic devices, etc.

The processor 1010 controls operations of the electronic device 1000. The processor 1010 may execute an operating system and at least one application to provide an internet browser, games, videos, or the like. The memory device 1020 may store data for operations of the electronic device 1000. The I/O device 1040 may include an input device such as a keyboard, a keypad, a mouse, a touchpad, a touch-screen, a remote controller, etc., and an output device such as a printer, a speaker, etc. The power supply 1050 may provide a power for operations of the electronic device 1000.

The display device 1060 includes a display panel. The display panel, the fingerprint recognition sensor 1030, the processor 1010 and the memory device 1020 in FIG. 27 may correspond to the display panel 110, the fingerprint recognition sensor 130, the processor 140 and the memory 150 in FIG. 4, respectively, and may perform the method of setting the light sources in the display panel according to example embodiments and the method of performing the optical fingerprint recognition according to example embodiments.

The inventive concept may be applied to various electronic devices and systems that include the display panels and the fingerprint recognition sensors and perform the optical fingerprint recognition. For example, the inventive concept may be applied to systems such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, etc.

The foregoing is illustrative of example embodiments and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of setting light sources in a display panel for optical fingerprint recognition, the method comprising:
   driving a portion of light sources among a plurality of light sources included in the display panel based on initial light source setting values, the portion of the light sources being disposed to correspond to a fingerprint recognition window which is a partial region of the display panel;
   obtaining initial calibration data based on reflected light of an object received by a fingerprint recognition sensor through the fingerprint recognition window while driving the portion of the light sources based on the initial light source setting values; and
   determining final light source setting values such that powers for driving light sources of different colors among the portion of the light sources are different, the final light source setting values being determined to minimize contrast of an interference signal included in the initial calibration data.

2. The method of claim 1, wherein:
   the initial calibration data includes a low frequency component and a high frequency component, and
   the interference signal corresponds to the high frequency component included in the initial calibration data.

3. The method of claim 1, wherein:
   the initial light source setting values are a same value for all of the portion of the light sources, and the final light source setting values are different values for the light sources of different colors among the portion of the light sources.

4. The method of claim 1, wherein determining the final light source setting values includes:
   determining a luminance of first light sources among the portion of the light sources as a first value, the first light sources having first color; and
   determining a luminance of second light sources among the portion of the light sources as a second value different from the first value, the second light sources having second color different from the first color.

5. The method of claim 4, wherein determining the final light source setting values further includes:
   determining a luminance of third light sources among the portion of the light sources as a third value different from the first value and the second value, the third light sources having third color different from the first color and the second color.

6. The method of claim 1, further comprising:
   determining the final light source setting values such that powers for driving light sources at different positions among the portion of the light sources are different, the final light source setting values being determined to optimize a magnitude of the interference signal included in the initial calibration data.

7. The method of claim 6, wherein the determining the final light source setting values such that the powers for driving the light sources at different positions are different includes:
   determining a luminance of first light sources among the portion of the light sources as a first value, the first light sources being disposed in a first region of the partial region; and
   determining a luminance of second light sources among the portion of the light sources as a second value different from the first value, the second light sources being disposed in a second region of the partial region different from the first region.

8. The method of claim 7, wherein the determining the final light source setting values such that the powers for driving the light sources at different positions are different further includes:
   determining a luminance of third light sources among the some light sources as a third value different from the first value and the second value, the third light sources being disposed in a third region of the partial region different from the first region and the second region.

9. The method of claim 1, further comprising:
   driving the portion of the light sources based on the final light source setting values; and
   obtaining final calibration data based on reflected light of the object received by the fingerprint recognition sensor through the fingerprint recognition window while driving the portion of the light sources based on the final light source setting values.

10. The method of claim 9, wherein the portion of the light sources are simultaneously turned on based on the initial light source setting values or the final light source setting values.

11. The method of claim 1, wherein:
    the display panel includes a first surface on which an image is displayed and a second surface opposite to the first surface, and
    the fingerprint recognition sensor is disposed under the second surface of the display panel.

12. The method of claim 11, wherein the fingerprint recognition sensor includes:
- a lens configured to concentrate the reflected light received through the fingerprint recognition window; and
- an image sensor configured to generate an image signal corresponding to the object on the partial region based on the reflected light concentrated by the lens.

13. A method of setting light sources in a display panel for optical fingerprint recognition, the method comprising:
- driving a portion of light sources among a plurality of light sources included in the display panel based on initial light source setting values, the portion of the light sources being disposed to correspond to a fingerprint recognition window which is a partial region of the display panel;
- obtaining initial calibration data based on reflected light of an object received by a fingerprint recognition sensor through the fingerprint recognition window while driving the portion of the light sources based on the initial light source setting values; and
- determining final light source setting values such that powers for driving light sources at different positions among the portion of light sources are different, the final light source setting values being determined to optimize a magnitude of an interference signal included in the initial calibration data.

14. The method of claim 13, wherein the powers for driving the light sources are determined such that a luminance of the portion of the light sources becomes lower as a light source becomes closer to a center of the partial region.

15. A method of performing optical fingerprint recognition, the method comprising:
- obtaining light source setting values and calibration data;
- displaying, in a fingerprint recognition mode, a fingerprint recognition window on a partial region of a display panel based on the light source setting values; and
- recognizing, in the fingerprint recognition mode, a fingerprint based on reflected light of the fingerprint received through the fingerprint recognition window and based on the calibration data,
- wherein obtaining the light source setting values and the calibration data includes:
  - driving a portion of light sources disposed to correspond to the fingerprint recognition window among a plurality of light sources included in the display panel based on initial light source setting values;
  - obtaining initial calibration data based on reflected light of an object received by a fingerprint recognition sensor through the fingerprint recognition window while driving the portion of the light sources based on the initial light source setting values;
  - determining final light source setting values such that powers for driving light sources of different colors among the portion of the light sources are different and/or powers for driving light sources at different positions among the some light sources are different, the final light source setting values being determined to minimize contrast of an interference signal included in the initial calibration data and/or to optimize a magnitude of the interference signal included in the initial calibration data, respectively;
  - driving the portion of the light sources based on the final light source setting values;
  - obtaining final calibration data based on reflected light of the object received by the fingerprint recognition sensor through the fingerprint recognition window while driving the portion of the light sources based on the final light source setting values; and
  - storing the final light source setting values and the final calibration data as the light source setting values and the calibration data.

16. The method of claim 15, wherein, after the final light source setting values and the final calibration data are obtained and stored, a fingerprint recognition operation is performed by loading the stored final light source setting values and the stored final calibration data.

17. The method of claim 16, wherein the final light source setting values and the final calibration data are obtained and stored when an electronic device including the display panel and the fingerprint recognition sensor is manufactured.

18. The method of claim 15, wherein recognizing the fingerprint includes:
- obtaining an image signal for the fingerprint based on the reflected light of the fingerprint received through the fingerprint recognition window; and
- obtaining final information for the fingerprint by subtracting the calibration data from the image signal.

19. The method of claim 15, further comprising:
- determining whether the fingerprint recognized in the fingerprint recognition mode is a fingerprint of an authenticated user.

20. The method of claim 15, further comprising:
- displaying, in the fingerprint recognition mode, an image on at least a portion of remaining regions of the display panel other than the partial region.

* * * * *